(12) United States Patent
Ito et al.

(10) Patent No.: US 6,892,009 B2
(45) Date of Patent: May 10, 2005

(54) APPARATUS AND METHOD FOR TRANSMITTING AND DETECTING LIGHT

(75) Inventors: Masami Ito, Moriguchi (JP); Masahiro Kuwabara, Moriguchi (JP); Tomotaka Furuta, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/398,812

(22) PCT Filed: Oct. 11, 2001

(86) PCT No.: PCT/JP01/08909
§ 371 (c)(1),
(2), (4) Date: Apr. 10, 2003

(87) PCT Pub. No.: WO02/31547
PCT Pub. Date: Apr. 18, 2002

(65) Prior Publication Data
US 2004/0042728 A1 Mar. 4, 2004

(30) Foreign Application Priority Data

Oct. 11, 2000 (JP) .......................................... 2000-310389
Sep. 17, 2001 (JP) .......................................... 2001-281434

(51) Int. Cl.$^7$ .............................. G02B 6/08; G02B 6/30
(52) U.S. Cl. .......................... 385/49; 385/147; 345/173; 349/65; 362/551
(58) Field of Search .......................... 385/49, 120, 147; 313/495; 345/104, 173; 349/61, 63, 64, 65, 113; 362/31, 551

(56) References Cited

U.S. PATENT DOCUMENTS

| | | | | |
|---|---|---|---|---|
| 6,628,352 | B1 * | 9/2003 | Sumida et al. ................ | 349/61 |
| 2001/0035924 | A1 * | 11/2001 | Fujieda ......................... | 349/65 |
| 2002/0101399 | A1 * | 8/2002 | Kubo et al. ................... | 345/104 |
| 2003/0025442 | A1 * | 2/2003 | Takeuchi et al. ............. | 313/495 |
| 2003/0026564 | A1 * | 2/2003 | Takeuchi et al. ............. | 385/120 |
| 2004/0061818 | A1 * | 4/2004 | Sumida et al. ............... | 349/113 |

FOREIGN PATENT DOCUMENTS

EP 1 030 201 8/2000

OTHER PUBLICATIONS

Uno T. et al., "Hybrid Integration of 1.3–mu Transmitter and 1.55–mu m Receiver with Fiber–Embedded Circuit", Proceedings of the 1997 Conference on Optical Fiber Communications; Dallas, TX, Feb. 16–21, 1997, pp. 277–278.

Mitsuda M. et al., "Extremely Low Tail Current Optical Transceiver Module for Passive Double Star TDMA Networks", OFC '98, Optical Fiber Communication Conference and Exhibit, Technical Digest, Conference Edition, 1998 OSA Technical Digest Series, vol. 2 (IEEE CAT. No. 98CH36177), OFC '98 Optical Fiber Communication Conference and Exhibit, Technical Digest Conference, p. 244, 1998, Washington, D.C.

Uno T. et al., "Hybridly Integrated Optical Transceiver Module for Access Netw rks", Electronic Components & Technology Conference, 1998, 48th IEEE Seattle, WA, May 25–28, 1998, New York, NY, USA IEEE, US, May 25, 1998, pp. 560–565.

* cited by examiner

Primary Examiner—Akm Enayet Ullah
(74) Attorney, Agent, or Firm—Wenderoth, Lind & Ponack, L.L.P.

(57) ABSTRACT

Positioned on a block is a filter for reflecting light λ1 and transmitting another light λ2. First and second light guides are positioned on the block in an aligned relation to each other so that their angled ends oppose to each other. An adhesive is applied to the angled ends of the light guides for holding a filter. Light λ2 is introduced in the light guides for adjusting the position of the light guides so that a predetermined amount of light is discharged from the light guide. A light receiver is positioned on the block through the adhesive and then light is introduced in the light guide for adjusting the position of the light receiver relative so that a predetermined amount of light is received by the light receiver. In particular, the adhesive has the same refractive index as the light guides.

21 Claims, 20 Drawing Sheets

US 6,892,009 B2

APPARATUS AND METHOD FOR TRANSMITTING AND DETECTING LIGHT

TECHNICAL FIELD OF THE INVENTION

The present invention relates to an apparatus and method for transmitting and detecting light. Also, the present invention relates to an optical device for detecting light having a specific wavelength.

BACKGROUND OF THE INVENTION

Conventionally, there has been disclosed an optical module or device for receiving light in JP 09-806458 (A). The optical device 200 has a substrate or positioning block 201 made of glass. A major surface 202 of the block 201 has a V-shaped groove 203 and an inclined, rectangular-shaped groove 204 crossing the V-shaped groove 203 both defined therein. The rectangular-shaped groove 204 receives an optical filter 205 for reflecting light having a wavelength of λ1 and transmitting another light having a wavelength of λ2. The V-shaped groove 203 receives first and second optical fibers 206 and 207 on opposite sides of the filter 205, respectively. The major surface 202 supports electrodes 208, which in turn support an optical element 209 with a light receiver through solder joints 210 for connecting between the light receiver 209 and the electrodes 208.

In operation, light having wavelengths of λ1 and λ2 is advanced from an open end of the first optical fiber 206 to the filter 205 where light λ1 is reflected toward the light receiver 209 and light λ2 is transmitted therethrough into the second optical fiber 207.

The optical device, however, has several drawbacks. For example, as can be seen from the drawing, the light receiver 209 is supported on the electrodes 208 and also solder joints 210 mounted on the electrodes 211, so that it is significantly spaced away from the filter 205, causing an expansion of light travelling from a reflecting portion of the filter 205 to the light receiver 209. This means that a small light detector fails to receive the whole light reflected by the filter, which prevents a compact and high-responsive light receiver suitable for a high-speed communication from being incorporated in such optical device.

Also, according to the publication, the angled groove for receiving the filter is formed after the optical fiber has been bonded on the block, which disadvantageously enlarges a distance between the opposing end surfaces of the separated optical fibers. This deteriorates an efficiency of light transmission between the opposing optical fibers.

Further, the filter is not secured in the groove, which may cause the filter to bend or curve. This changes a direction of light reflected by the filter, reducing an efficiency for receiving light by the light receiver.

SUMMARY OF THE INVENTION

Accordingly, an optical device of the present invention includes a block having a first positioning portion and a second positioning portion defined therein; first and second light guides positioned in the first positioning portion an aligned relation to each other, opposing ends of the first and second light guides being angled at a certain angle; a filter positioned in the second positioning portion and between the opposing ends of the first and second light guides so that the angled opposing ends substantially contact with opposite surfaces of the filter, respectively, the filter bearing a filtering layer for reflecting light having a first wavelength and transmitting light having a second wavelength; a light receiver for receiving the light reflected by the filtering layer; and an adhesive filled between at least one neighboring members selected among the block, the first and second light guides, the filter, and the light receiver, the adhesive having substantially the same refractive index as those of the neighboring members and transmitting the light between the neighboring members.

Also, a method for manufacturing an optical device of the present invention has steps of positioning a filter in a first positioning portion of a block, the filter having a filtering layer for reflecting light having a first wavelength and transmitting light having a second wavelength; positioning first and second light guides in an aligned relation to each other in second positioning portions formed on opposite sides of the filter, respectively, opposing ends of the first and second light guides being angled at a certain angle; applying a first adhesive to the opposing angled ends of the first and second light guides, the first adhesive having the same refractive index as those of the light guides; holding the filter between the angled ends of the first and second light guides; introducing the light having the second wavelength into one of the first and second light guides; adjusting the position of the first light guide relative to the second light guide so that a predetermined amount of light is discharged from the other of the first and second light guides and then fixing the first and second light guides; positioning a light receiver on the block through a second adhesive applied therebetween, the second adhesive having the same refractive index as those of the light guides; introducing the light having the first wavelength into one of the first and second light guides; and adjusting the position of the light receiver relative to the light guide so that a predetermined amount of light is received by the light receiver and then fixing the light receiver.

BRIED DESCRIPTION OF THE DRAWINGS

It should be noted that although the optical device of the present invention is small in size, each part of the optical device is depicted in an exaggerated fashion for clarity. Also, like parts are designated like reference numerals throughout the drawings.

PREFERRED EMBODIMENTS OF THE PRESENT INVENTION

Figure 1:
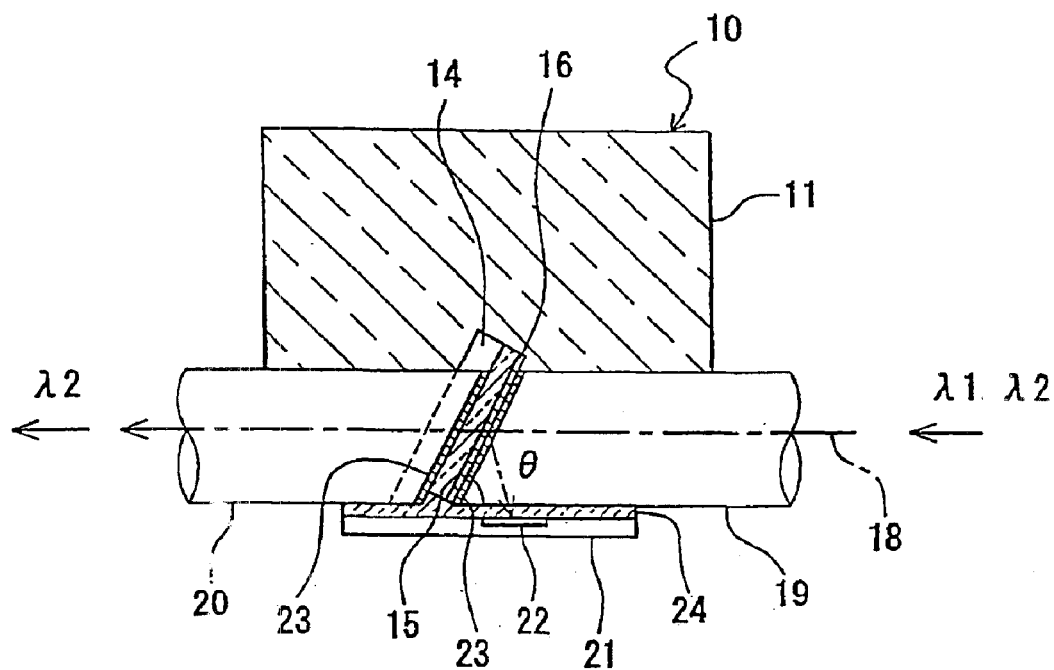
FIG. 1 is an enlarged cross sectional view of an optical device according to the first embodiment of the present invention.

With reference to the drawings, several embodiments of the present invention will be discussed in detail hereinafter.
First Embodiment FIG. 1 shows an optical element or device according to the first embodiment of the present invention, generally indicated by reference numeral 10. The optical device 10 has a main body or positioning block 11 shown upside down in FIG. 2. Preferably, the block 11 is made of transparent material such as glass and is in the form of rectangular box, although not restrictive to the present invention. A major surface 12 of the block 11 (bottom surface in FIG. 1 and top surface in FIG. 2) has a first positioning portion or groove 13 extending in one direction and a second positioning portion or groove 14 extending in another direction perpendicular to the one direction, both defined therein. Preferably, the first groove 13 is V-shaped, and the second groove is rectangular-shaped. The second groove 14 is inclined at an angle of θ to the surface 12.

Referring back to FIG. 1, the second groove 14 receives an optical plate or filter 15 made of transparent material such as glass or synthetic resin including polyimide. The filter 15 bears a filtering layer 16 on its one surface, selectively reflecting a specific light having a wavelength of λ1. Preferably, the filtering layer 16 is formed by a conventional vapor deposition technique. The filter 15 is positioned in the second groove 14 so that the filtering layer faces one side wall 17 (see FIG. 2) of the groove 14. This causes that light λ1 travelling in a direction indicated by arrow 18 is selectively reflected by the filtering layer 16 toward the major surface 12 of the block 11.

A pair of light guides 19 and 20, made from optical fiber or hollow tube, for example, are positioned in an axial alignment in respective portions of the first groove 13 separated by the second groove 14. One ends of the light guides 19 and 20, opposing to each other through the filter 15, are inclined at the angle of θ. The light guides 19 and 20, so constructed, are oriented so that the angled end surfaces substantially contact with the opposite sides walls of the filter 15, which prevents the filter 15 from bending or curving.

A light receiving element or device 21 having a light receiver 22 is fixed on the major surface 12 of the light guide 19 through a suitable bonding material 23 so that the light reflected from the filtering layer 16 of the filter 15 is received by the light receiver 23. An adhesive capable of transmitting light λ1 so efficiently is used for the bonding material 23. Preferably, the bonding material has the same refractive index as those of light guides 19 and 20 and the filter 15.

Figure 2:
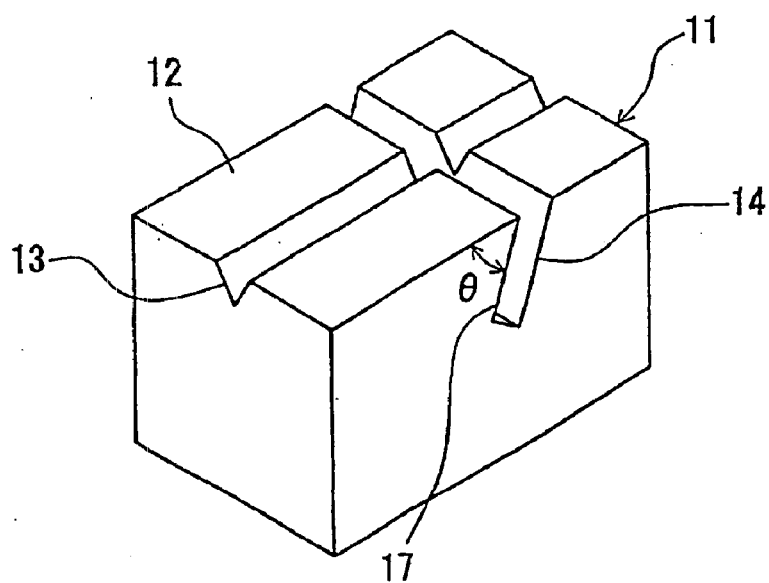
FIG. 2 is an enlarged perspective view of a positioning block.
Figure 3:
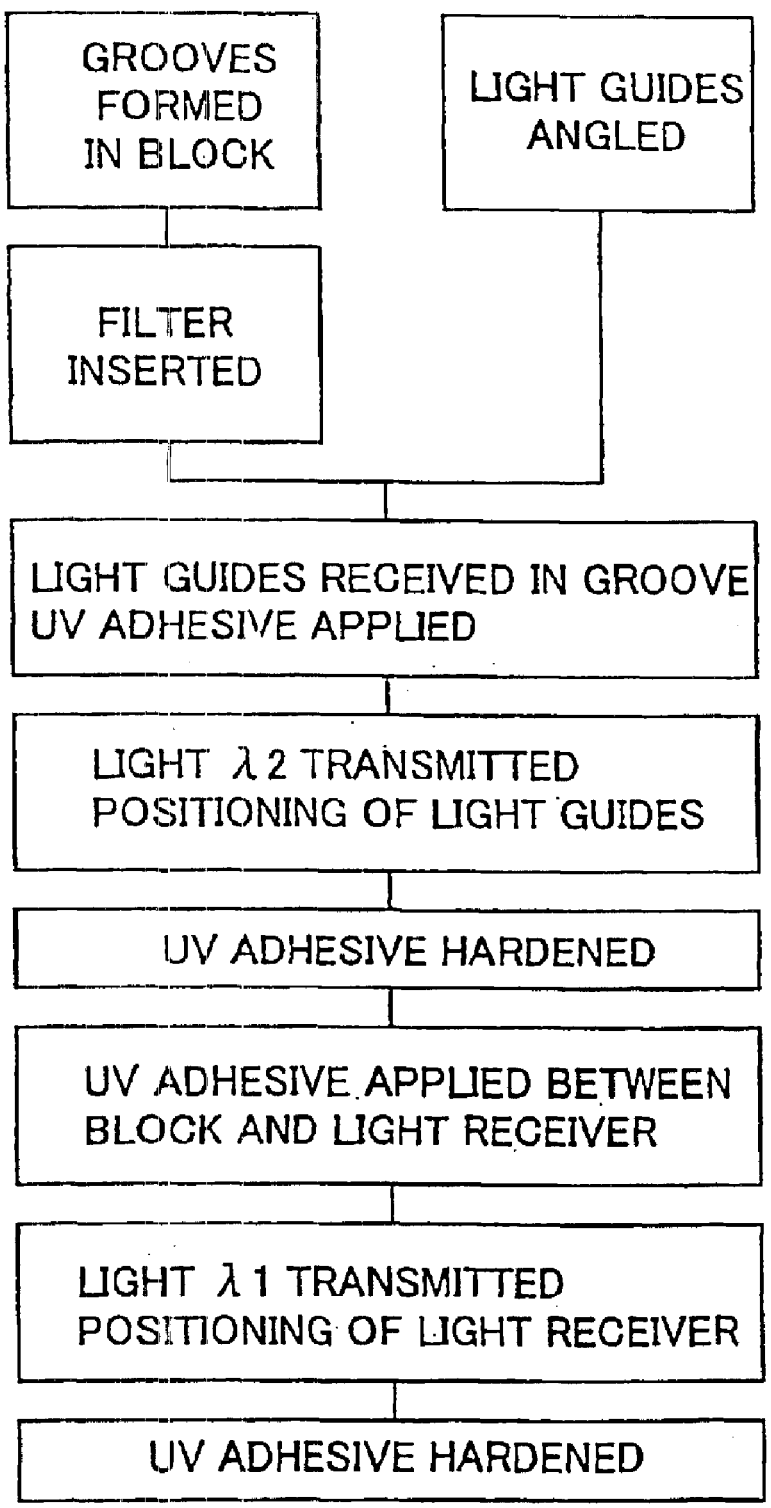
FIG. 3 is a flowchart showing a method of manufacturing the optical device in FIG. 1.
Figure 4:
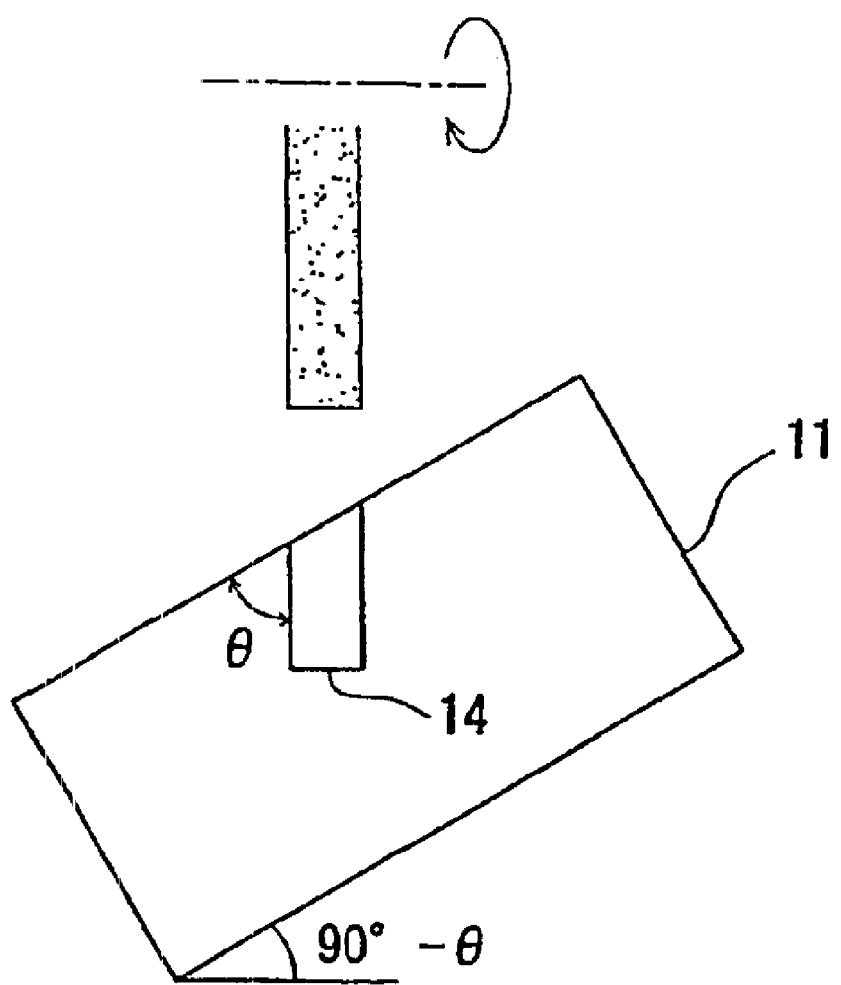
FIG. 4 is a schematic side elevational view showing a situation in which an angled rectangular-shaped groove is formed.

The optical device 10 is manufactured through various processes. For example, as shown in FIG. 3, the block 11 is formed with the first and second grooves 13 and 14. Preferably, as shown in FIG. 4 the rectangular-shaped groove 14 is formed a rotating cutter or saw while the block 11 is angled at (90°−θ) by the use of a positioning device (not shown). Then, the filter 15 is inserted in the angled groove 14 so that the filtering layer 16 faces to the wall 17 defining the angle θ with the major surface 12 as shown in FIG. 2. One ends of the light guides 19 and 20 are polished or ground so that they have the angle θ to their longitudinal axes. The light guides 19 and 20 are mounted in the separated, respective portions of the first groove 13 with their angled end surfaces opposed to the opposite side surfaces of the filter 15. Before the arrangement of the light guides 19 and 20, the opposite side surfaces of the filter 15 or the angled end surfaces of the light guides 19 and 20 are applied with a suitable bonding material capable of being hardened by an exposure of light such as ultraviolet rays, i.e., UV hardening adhesive 23. Preferably, the bonding material has the same refractive index as those of light guides and filter. Then, light having a wavelength of λ2 is introduced in the opposite end of the first light guide 19, away from its angled end. Positions of the light guides 19 and 20 are adjusted so as to maximize an amount of light emitted from the opposite end of the second light guide 20, away from its angled end. Then, the bonding material is exposed to ultraviolet rays so that it is hardened for the permanent connection between the light guides 19 and 20 and the filter 15.

When the angled ends of the light guide 19 and 20 are forced into close contacts with the respective surfaces of the filter 15, an excess of the bonding material 23 applied at the ends of the light guides 19 and 20 can flow out onto the peripheral surfaces of the light guides 19 and 20. This also prevents the possible bending or curving of the filter. The bonding material on the light guides 19 and 20 can extend a distance between the light reflecting portion of the filter 15 and the light receiver 22, expanding a diameter of light spot on the light receiver 22. Therefore, a low viscosity adhesive is preferably used for the bonding material. Alternatively, the excess hardened adhesive may be polished away to minimize a thickness of the bonding material on the light guides 19 and 20. Also, a portion of the filter 15 protruded from and between the opposing light guides 19 and 20 is preferably removed by polishing or grinding, for example.

Next, the UV hardening adhesive 24 is applied on the major surface 12 of the block 11 and then the light receiving device 21 is mounted on the adhesive 24. Then, light λ1 is introduced in the first light guide 19 and the position of the light receiving device 21 relative to the block 11 is adjusted so as to maximize the amount of light received by the light receiver 22. Finally, the UV hardening adhesive 24 is exposed to ultraviolet rays through the block 11 for its hardening.

In operation of the optical device 10 so constructed, when light λ1 and λ2 is guided into the first light guide 19, one light λ1 is reflected at the filtering layer 16 into the light receiver 22 and the other light λ2 is transmitted through the filtering layer 16 and the filter 15 into the second light guide 20. At this moment, since the first light guide 19 substantially contacts with the light receiver 22 through, if any, a thin layer of bonding material and also the filer 15 is nipped by the opposing surfaces of the light guides, the reflected light is transmitted efficiently into the light receiver 22.

Also, since the first and second light guides 19 and 20 are well connected through the filter 15 so as to minimize a distance therebetween, causing light λ2 to be transmitted into the second light guide 20 with an improved efficiency.

Further, since the bonding material has the same refractive index as those of light guides 19 and 20 and filter 15, a loss of light caused by the reflection at boundaries of those members is minimized. This also eliminates any displacement of light path, which would otherwise be caused by the reflection at the boundaries of the members.

Although the V-shaped groove 13 is used for the positioning of the light guides 19 and 20, any configuration or means is employed instead.

Also, the block 11 is made of quartz in order to minimize a difference between heat expansion rates of light guide 19 and 20 of optical fiber and the block 11. This in turn minimizes heat deterioration caused by a heat dependency.

Second Embodiment

Figure 5:
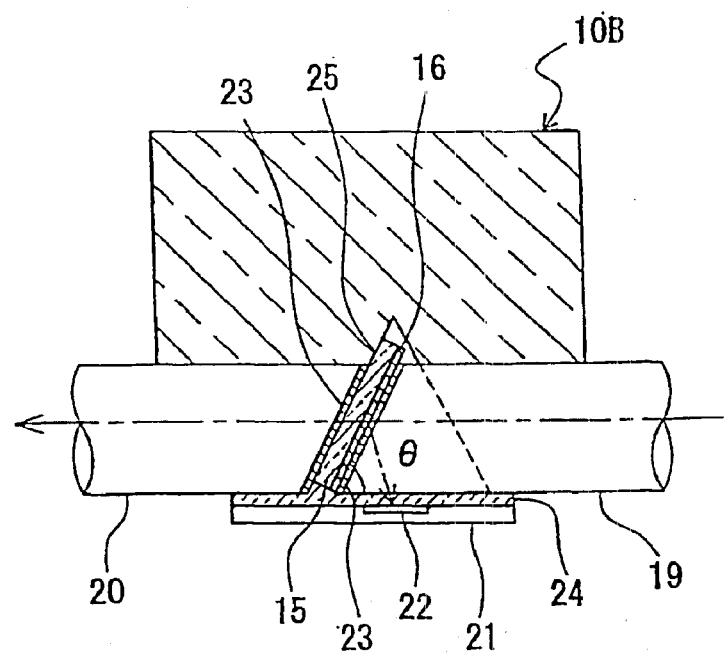
FIG. 5 is an enlarged cross sectional view of the optical device according to the second embodiment of the present invention.
Figure 6:
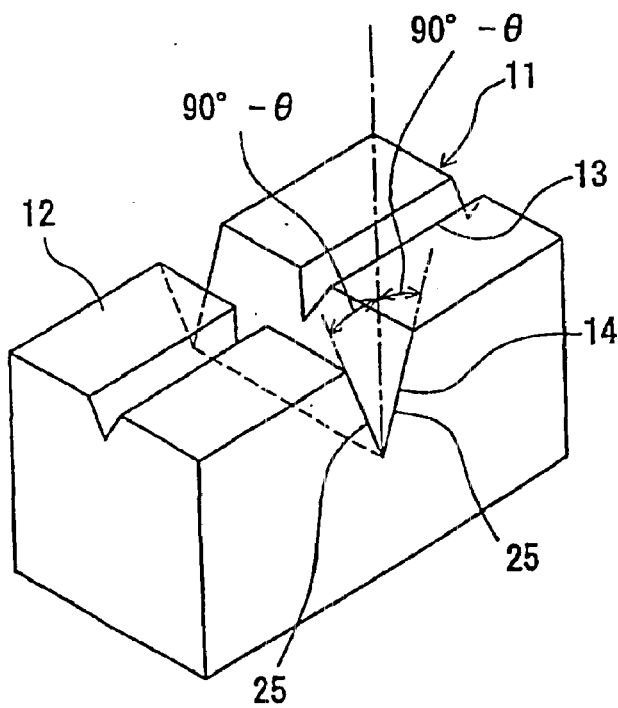
FIG. 6 is an enlarged perspective view of another positioning block.

FIGS. 5 and 6 show another optical device according to the second embodiment of the present invention. The optical device 10B is featured in that the second positioning portion is embodied in the form of V-shaped groove 14. The groove 14 has a pair of symmetric opposing surfaces 25 each angled at an angle of 90°−θ to a vertical line perpendicular to the surface 12 of the block 11. The filter 15 is positioned on either of two surfaces 25 so that the filtering layer 16 opposes thereto.

Figure 7:
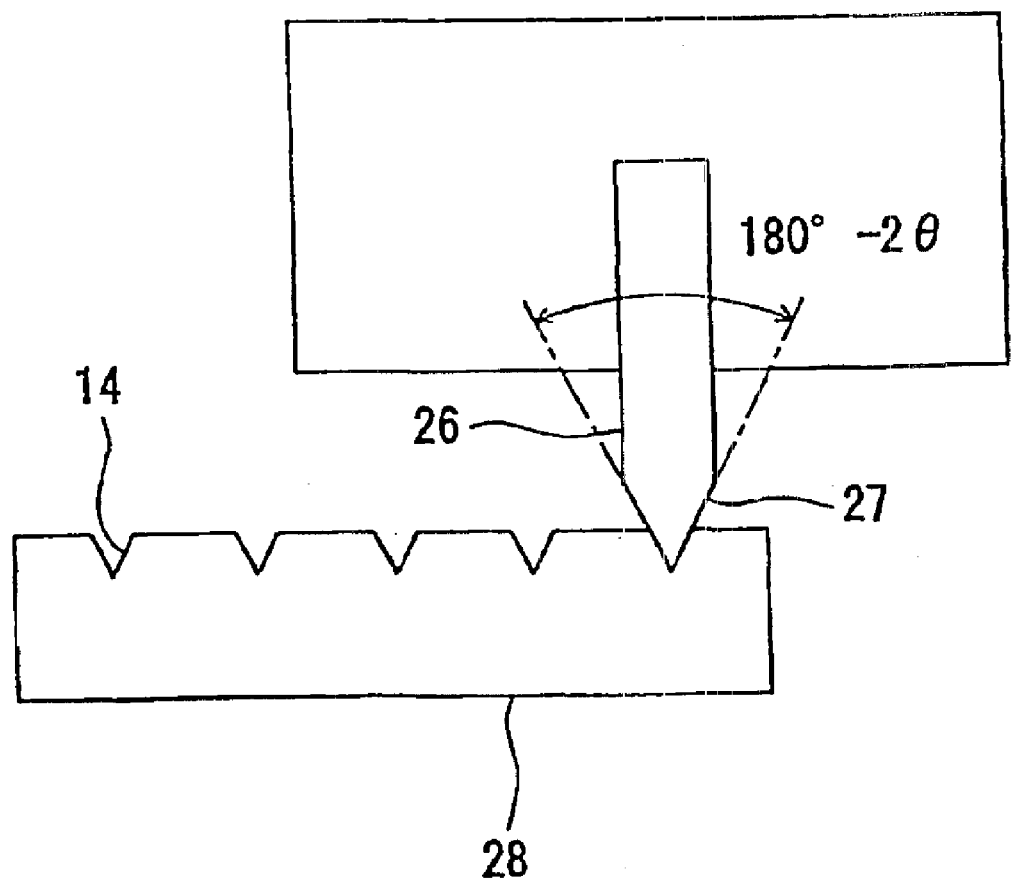
FIG. 7 is a side elevational view showing a method for forming V-shaped grooves.

As shown in FIG. 7, the V-shaped groove 14 is formed by the use of a cutting device 26 with a tapered cutting edge 27 at an angle of 180°−2θ. Preferably, the grooves 14 are formed at regular intervals in a surface of a large substrate 28 which will subsequently be divided into blocks 11. This increases a productivity of the blocks and the optical devices and decreases a manufacturing cost thereof.

Third Embodiment

Figure 8:
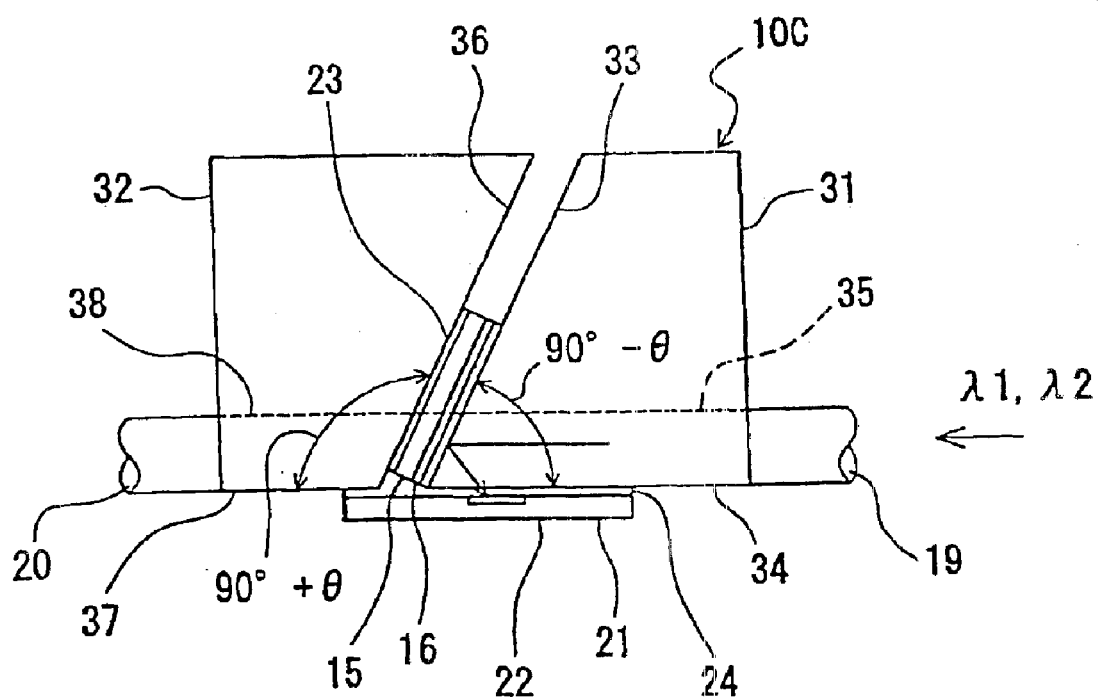
FIG. 8 is an enlarged side elevational view of the optical device according to the third embodiment of the present invention.

FIG. 8 shows another optical device according to the third embodiment of the present invention. The optical device 10C has a pair of first and second blocks 31 and 32. The first block 31 has a surface 33 opposing to the second block 32, angled at an angle of 90°−θ to the major surface 34 in which the first positioning portion, e.g., V-shaped groove 35, is formed therein. The second block 32, on the other hand, has a surface 36 opposing to the first block 31, angled at an angle of 90°+θ to the major surface 37 in which the second positioning portion, e.g., V-shaped groove 38, is formed therein. Preferably, the angled surfaces 33 and 36 of the first and second blocks 31 and 32 are polished and then smoothed in order to reduce a loss of light transmission. The first and second blocks 31 and 32 are arranged so that the angled surfaces 33 and 36 oppose to each other in a parallel fashion to hold the filter 15 therebetween. This prevents the filter 15 from curving or bending.

Figure 9:
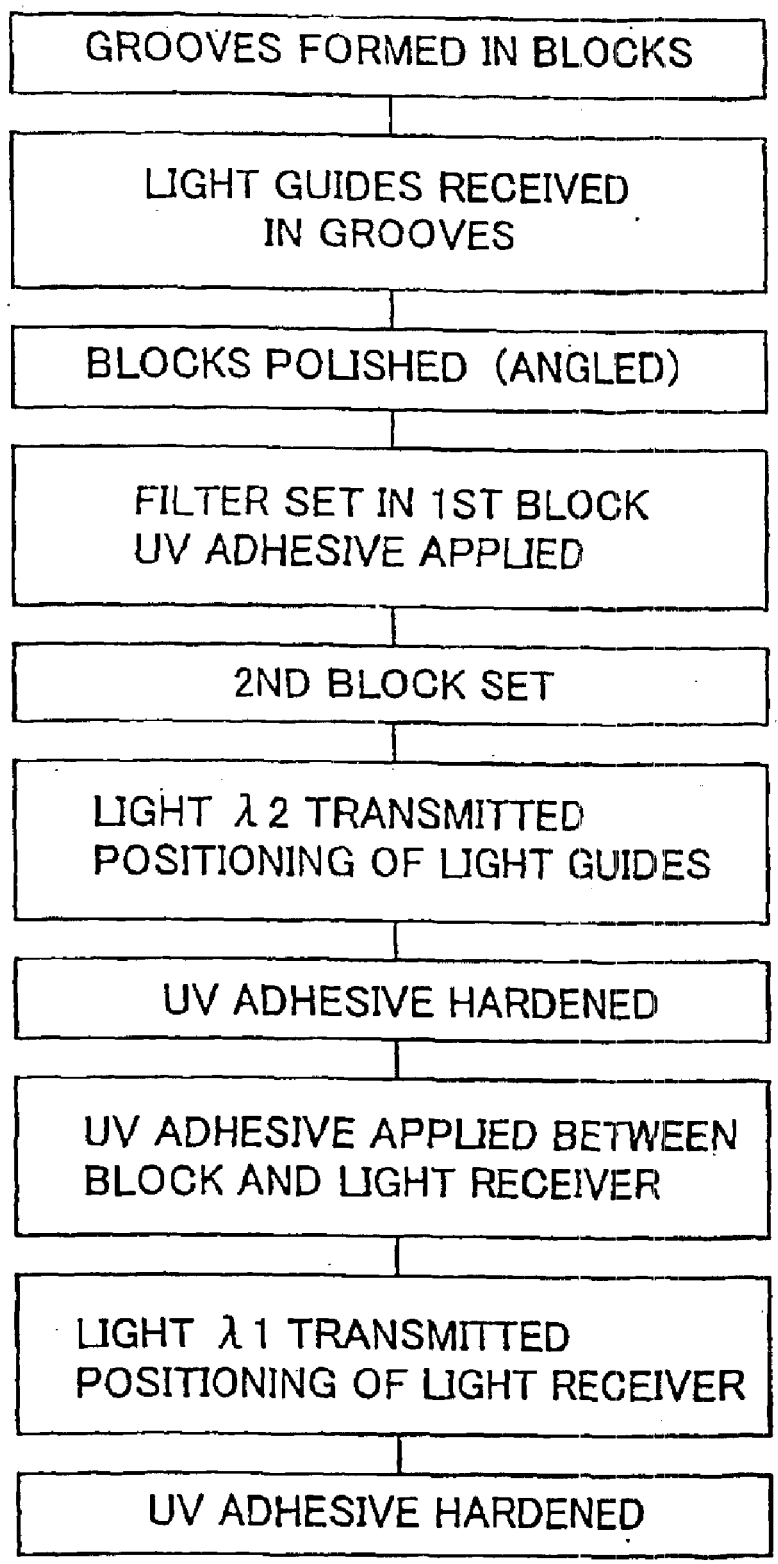
FIG. 9 is a flowchart showing a method for manufacturing the optical device in FIG. 8.

The optical device 10C is manufactured through various processes. For example, as shown in FIG. 9, two glass bodies each in the form of rectangular prism are prepared. For each glass body, the first positioning portion, e.g., V-shaped groove 35, 38, is formed in a major surface 34, 37 of the body. Then, the light guide 19, 20 is positioned in the groove 35, 38 with its one end projected from the corresponding side surface of the body in which the angled surface will be defined. The light guide 19, 20 is then fixed in the groove 35, 38 by the use of suitable adhesive such as bonding material capable of being hardened by an irradiation of ultraviolet rays.

Then, the side surfaces of the glass bodies and one ends of the light guides projected therefrom are polished flush to have the angle of 90°−θ and 90°+θ, respectively, which completes the first and second blocks 31 and 32. Then, the UV hardening adhesive 23 is applied to the angled surface 33 of the first block 31 and the angled end surface of the first light guide 19. The filter 15 is mounted on the angled end surface of the first light guide 19 with its filtering layer 16 opposed to the angled surface 33. Also, the second block 32 is positioned so that its angled surface 36 faces to the corresponding angled surface 33 of the first block 31 and also the second light guide 20 opposes to the first light guide 19 in an axial alignment.

Next, light having a wavelength of λ2 is introduced in the first light guide 19. A suitable light detector not shown is provided to detect light emitted from the opposite end of the second light guide 20, away from the filter. Using the output of the detector, a relative arrangement of the first and second blocks 31 and 32 are adjusted to maximize an amount of light emitted from the second light guide 20. Afterwards, the UV hardening adhesive 23 is exposed to ultraviolet light for it hardening. If necessary, a portion of the filter projected from the major surfaces 34 and 37 of the blocks 31 and 32 is removed.

The light receiving device 21 is held on the major surface 34 of the first block 31 or the first and second blocks 31 and 37 through a suitable bonding material such as the UV hardening adhesive 24. Then, light having a wavelength of λ1 is introduced in the first light guide 19. In this condition, light reflected at the filtering layer 15 is received by the light receiver 22. Using the output of the light receiver 22, a position of the light receiving device 21 relative to the blocks 31 and 32 is adjusted so that a maximum amount of light is received by the light receiver 22. Preferably, the adhesive 24 has the same refractive index as those of blocks 31 and 32, light guides 19 and 20 and filter 15 in order to minimize the loss of light at respective boundaries thereof.

According to this embodiment, the light guides are held on the blocks 31 and 32 and then aligned with each other, rendering the alignment thereof in a great precision and minimizing an optical loss therebetween. Also, the filter 15 is held and positioned between the blocks 31 and 32 so as to prevent its unwanted displacement or bending, minimizing a deterioration of the transmitting and reflecting features thereof. For comparison, according to the experiments conducted by the inventors, the transmitting loss of light of the optical device according to the first and third embodiments were 0.6 dB and 0.3 dB, respectively.

Fourth Embodiment

Figure 10:
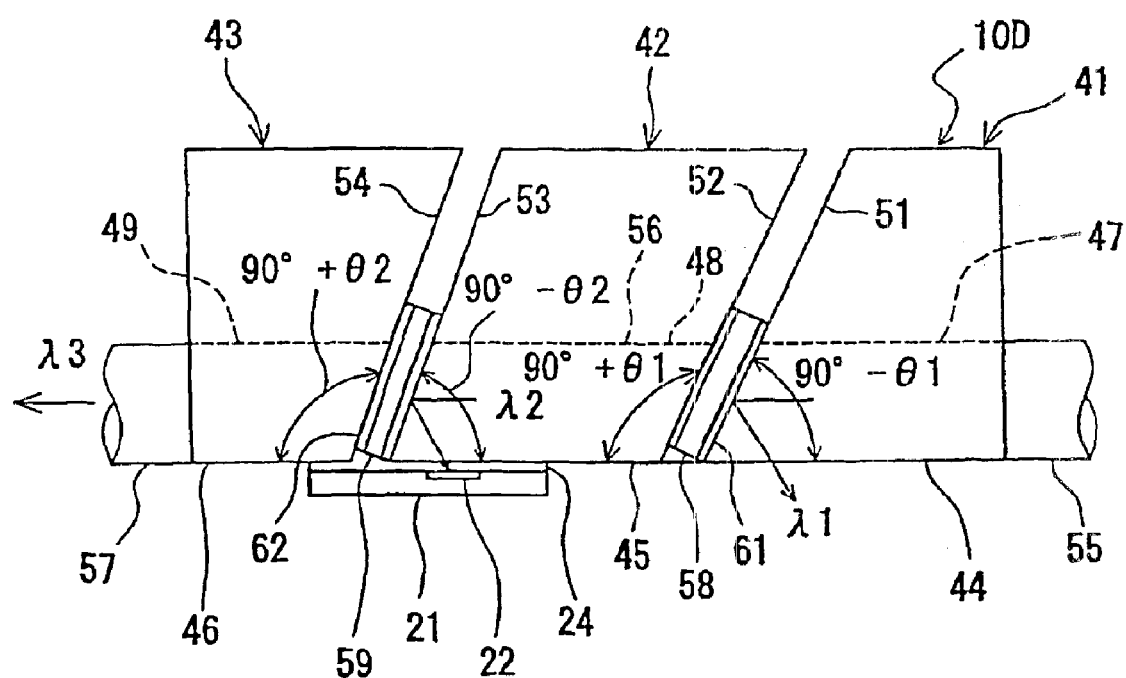
FIG. 10 is an enlarged side elevational view of the optical device according to the fourth embodiment of the present invention.

FIG. 10 shows another optical device according to the fourth embodiment of the present invention. The optical device 10D has three blocks 41, 42 and 43 arranged in a row. The blocks 41, 42 and 43 have major surfaces 44, 45, and 46 positioned on a plane extending in a horizontal direction in the drawing and defined with positioning portions or V-shaped grooves 47, 48 and 49, respectively. Also, the first block 41 has a surface 51 opposing to the second block 42, angled at 90°−θ1 to the major surface 44. The second block 42 has opposite surfaces 52 and 53 opposing to the first and third blocks 41 and 42, angled at 90°+θ1 and 90°−θ2 to its major surface 45, respectively. The third block 43 has a surface 54 opposing to the second block 42, angled at 90°+θ2 to the major surface 46.

The grooves 47, 48 and 49 of the first to third blocks 41, 42 and 43 receive first to third light guides 55, 56 and 57 or optical fibers, respectively. In particular, one end of the first light guide 55 adjacent to the angled surface 51 of the first block 41 is polished flush with the angled surface 51. The opposite ends of the second light guide 56 are polished flush with the opposite angled surfaces 52 and 53 thereof, respectively. Likewise, one end of the third light guide 57 adjacent to the angled surface 54 of the third block 43 is polished flush with the angled surface 54.

First and second filters 58 and 59 are positioned and held between the angled opposing surfaces 51 and 52 and of first block and second blocks 41 and 42 and the angled opposing surfaces 53 and 54 of the second and third blocks 42 and 43, respectively. This prevents the filters 58 and 59 from bending or curving. The first filter 58 bears a first filtering layer (not shown) capable of reflecting light having a wavelength of $\lambda 1$ and transmitting light having wavelengths of $\lambda 2$ and $\lambda 3$ on its surface opposing to the angled surface of the first block 41. The second filter 59 bears a second filtering layer (not shown) capable of reflecting light having a wavelength of $\lambda 2$ and transmitting light having a wavelength of $\lambda 3$ on its surface opposing to the angled surface of the second block 42. Preferably, the first and second filtering layers are formed by the conventional film formation such as vapor deposition technique. The blocks and filters are securely fixed to each other by the use of suitable bonding material 24. Also, a light receiving device 21 is secured on the major surface 45 of the second block 42 so that light $\lambda 2$ reflected by the second filter is received by a light receiver 22 of the light receiving device 21. Preferably, the bonding material is a UV hardening adhesive. Also, the bonding material has the same refractive index as those of blocks, light guides and filters.

The optical device 10D is manufactured through various processes. For example, three glass bodies each in the form of rectangular prism are prepared. For each glass body, the positioning portion, e.g., V-shaped groove, is formed in the major surface of the body. Then, the first light guide 55 is positioned in the groove 47 of the first body with its one end slightly projected from the corresponding side surface of the body in which the angled surface will be defined. Also, the second light guide 56 is positioned in the groove 48 of the second body with its opposite ends slightly projected from the opposite side surfaces of the body in which the angled surfaces will be defined. Further, the third light guide 57 is positioned in the third groove 49 of the third body with its one end slightly projected from the corresponding side surface of the body in which the angled surface will be defined.

The first to third light guides 55–57 are secured in the corresponding grooves 47–49 by the use of UV hardening adhesive. Then, each side surface of the bodies from which the terminal end of the light guide is projected is polished with the projected end of the light guide to form angled surfaces of the block and the light guide. As described above, the angled surface of the first block 41 has the angle of 90−θ1. The angled opposite surfaces of the second block 42 have angles of 90+θ1 and 90−θ2, respectively. The angled surface of the third block 43 has the angle of 90+θ2.

Next, the UV hardening adhesive 61 is applied to the angled surface of the first block 41, to which the first filter 58 and the corresponding angled surface of the second block 42 are positioned so that the first and second light guides 55 and 56 are axially aligned with each other through the first filter 58. The filtering layer (not shown) of the first filter 58 is faced to the angled surface of the first block. Then, light $\lambda 2$ or $\lambda 3$ is introduced in the first light guide 55. Light emitted from the second light guide 56 is detected by a suitable detector. Also, the positions of the first and second blocks 41 and 42 are adjusted so that an amount of light detected by the detector is maximized. Then, the UV hardening adhesive is exposed to ultraviolet rays for its hardening. If necessary, a portion of the first filter projected from the blocks is cut out.

Likewise, the UV hardening adhesive 62 is applied to the angled opposite surface of the second block 42, to which the second filter 59 and the corresponding angled surface of the third block 43 are positioned so that the first and second light guides 56 and 57 are axially aligned with each other through the second filter 59. The filtering layer of the second filter 59 is faced to the angled surface of the second block. Then, light having a wavelength $\lambda 3$ is introduced in the first light guide 55. Light emitted from the second light guide 42 is detected by a suitable detector. Also, the positions of the second and third blocks are adjusted so that an amount of light detected by the detector is maximized. Then, the UV hardening adhesive is exposed to ultraviolet rays for its hardening. If necessary, a portion of the second filter projected from the blocks is cut out.

Subsequently, the light receiving device 21 is held on the second block through the UV hardening adhesive 24 applied therebetween. Using the output of the light receiver 22, a position of the light receiving device 21 relative to the second block 42 is adjusted so that the maximum amount of light is received by the light receiver 22. Finally, the UV hardening adhesive 24 is exposed to ultraviolet rays for its hardening.

In operation of the optical device 10D so constructed, when light having wavelengths of $\lambda 1$, $\lambda 2$ and $\lambda 3$ is guided into the first light guide 41, light $\lambda 1$ is reflected and light $\lambda 2$ and $\lambda 3$ is transmitted through the first filter 58 into the second light guide 56. Then, light travels through the second light guide 56 to the second filter 59 where light $\lambda 2$ is reflected into the light receiver 22, and light $\lambda 3$ is transmitted through the filter 59 and the third light guide 57 and then discharged from the opposite end of the third light guide 43. At this moment, since the light guides, filters and light receiver are optically connected through the adhesive, which minimizes loss of light at the boundaries thereof.

Also, the filters are securely held between the neighboring surface of the light guides to prevent the curving or bending of the filters, which ensures light reflected by the filters to orient in predetermined directions.

Fifth Embodiment

Figure 11:
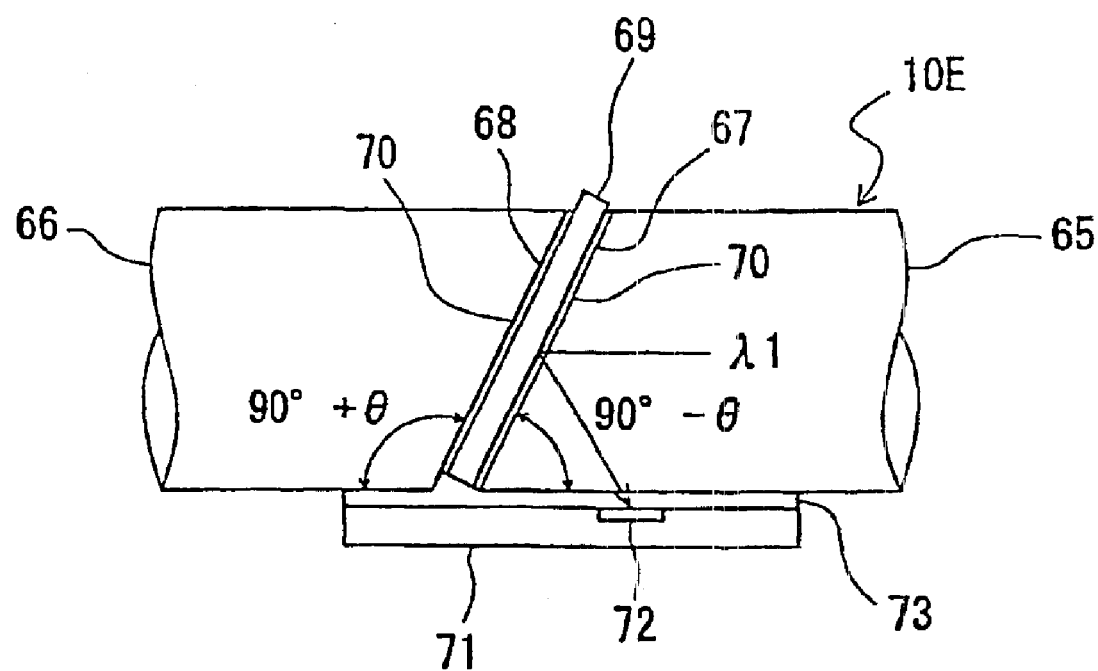
FIG. 11 is an enlarged side elevational view of the optical device according to the fifth embodiment of the present invention.

FIG. 11 shows another optical device according to the fifth embodiment of the present invention. The optical device 10E has a pair of first and second light guides 65 and 66. Preferably, the light guides are made from optical fiber.

End surfaces of the first and second light guides 67 and 68 are polished to have an angle of 90°-θ. The angled end surfaces 67 and 68 of the first and second light guides 65 and 66 are connected to each other in an axial fashion through a filter 69 by the use of suitable bonding material 70 so that they contact closely with each other. In this instance, the filter 69 is held between the opposing surfaces of the light guides, which prevents the curving or bending of the filter. The filter 69 has a filtering layer (not shown) on its one surface facing to the first light guide 65. The filtering layer, which is preferably formed by a conventional film formation technique such as vapor deposition, reflects light having a wavelength of λ1 and transmits light having a wavelength of λ2. A light receiving device 71 having a light receiver 72 is secured on a periphery of the first light guide 65 by the use of the UV hardening adhesive 73 so that light reflected at the filtering layer is received by the light receiver 72.

Figure 12:
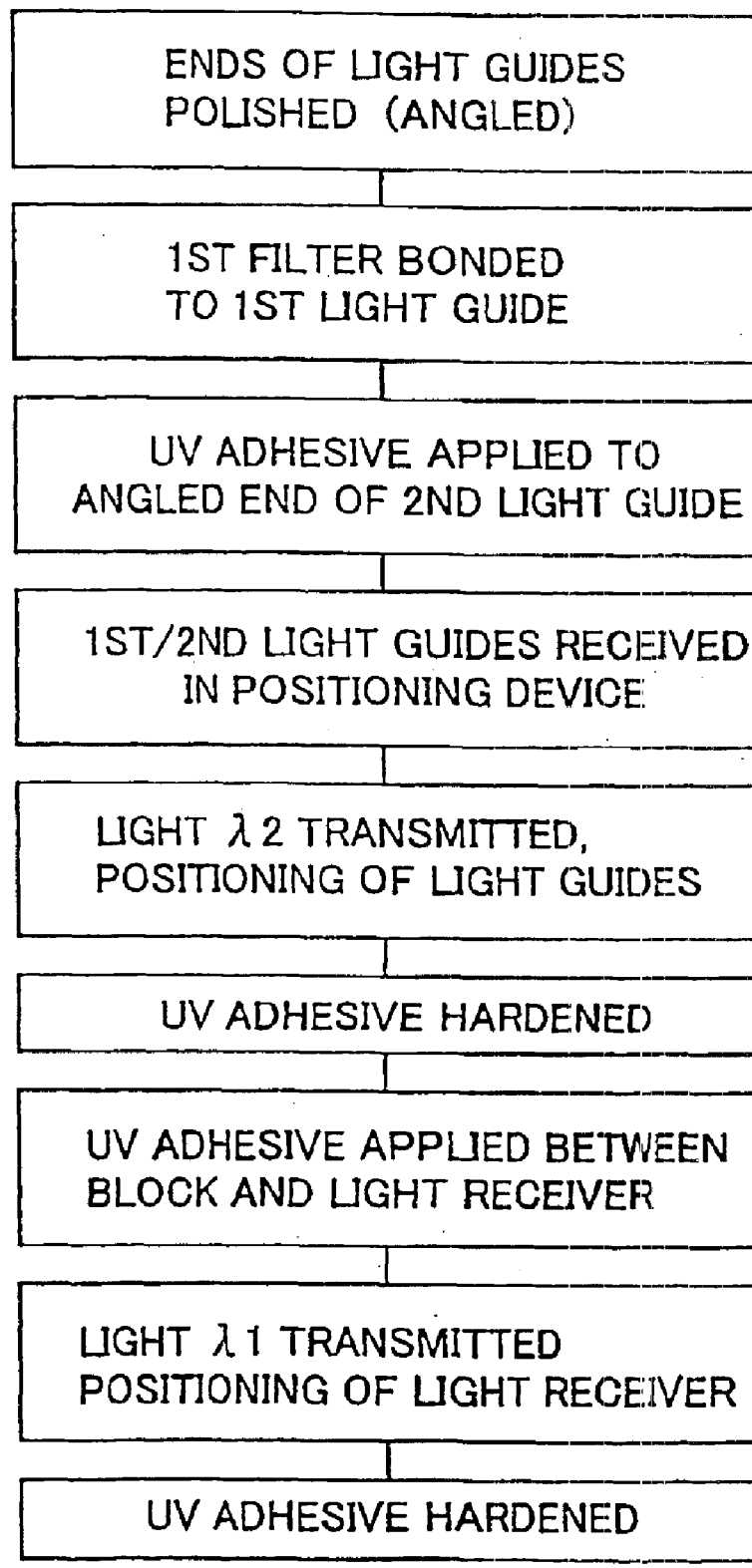
FIG. 12 is a flowchart showing a method for manufacturing the optical device in FIG. 11.

The optical device 10E is manufactured through various processes. For example, as shown in FIG. 12, two light guides made from optical fiber are prepared. One ends of the light guides 65 and 66 are angled to have the angle of 90°-θ by a suitable polishing or grinding. For connecting the first and second light guides 65 and 66 through the filter, the UV hardening adhesive 70 is applied to the angled end of the first light guide, on which the filter is positioned with its filtering layer opposed to the angled surface through the adhesive. Then, ultraviolet light is irradiated to harden the bonding material.

Figure 13A:
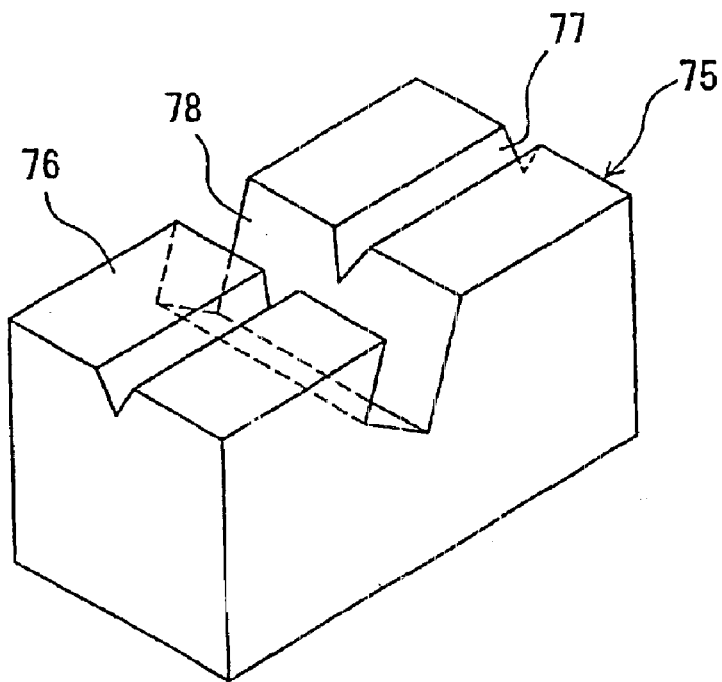
FIGS. 13A and 13B are enlarged perspective views of the positioning blocks used in the manufacturing of the optical device in FIG. 11.
Figure 13B:
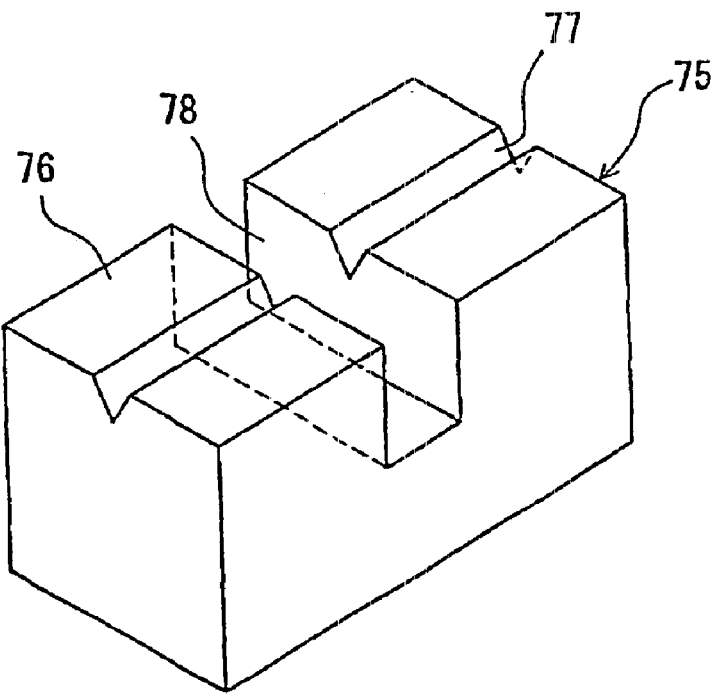
Figure 14:
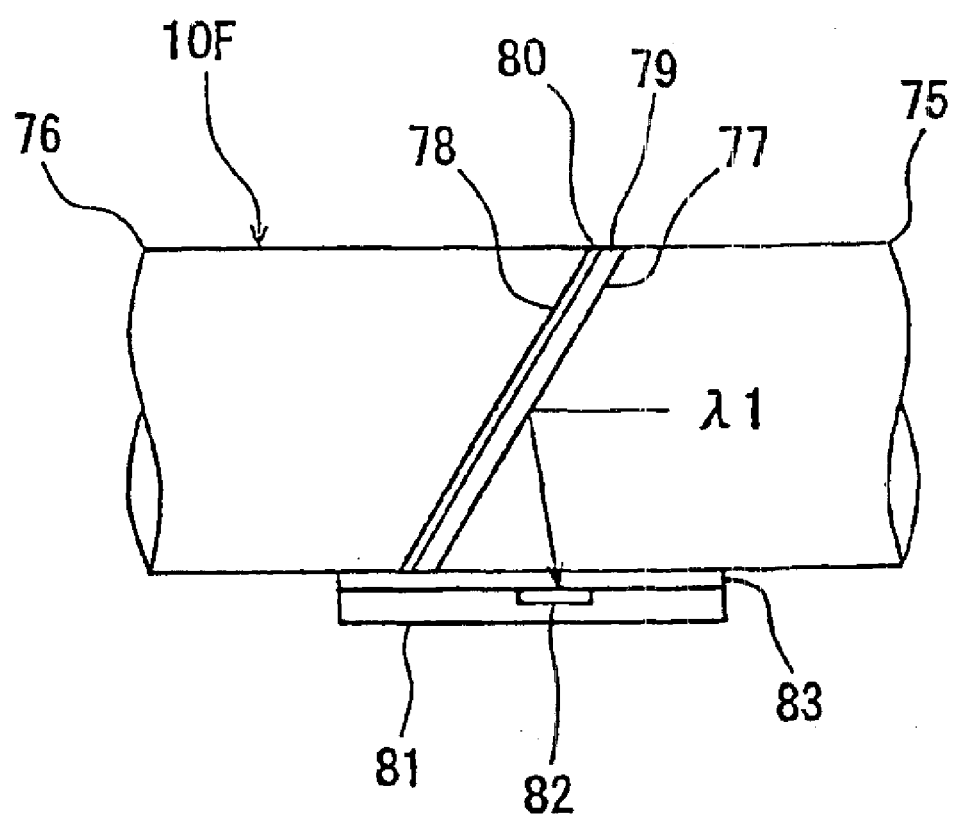
FIG. 14 is an enlarged side elevational view of the optical device according to the sixth embodiment of the present invention.

Next, a positioning block shown in FIG. 13 or 14 is provided. The positioning block 75 includes a major surface 76 having a first positioning portion 77 extending in one direction and a second positioning portion 78 extending in another direction perpendicular to the one direction defined therein. In this embodiment, the first and second positioning portions 77 and 78 are defined by a V-shaped groove and a rectangular-shaped groove, respectively. Preferably, as shown in FIG. 13A, the rectangular-shaped groove 78 is angled at an angle of θ to the major surface of the block.

Using the positioning block 75, the first and second light guides 65 and 66 are positioned in a predetermined manner. For example, the fist light guide 65 is positioned in the V-groove 77 so that the filter 69 is positioned in the angled groove. Preferably, a width of the rectangular-shaped groove 78 is enlarged so that the filter 69 can easily be positioned in the groove 78 without any interference with the block 75. The UV hardening adhesive 70 is applied to the angled surface 68 of the second light guide 66 which is then positioned in the remaining portion of the V-groove 76. Also, the angled surface 68 of the second light guide 66 is brought into close contact with the opposite surface of the filter 69 so that the second light guide 66 is aligned with the first light guide 65.

Light having a wavelength of λ2 is introduced in the opposite end of the first light guide, which is transmitted through the filter into the second light guide. The light discharged from the opposite end of the second light guide 66 is detected by a light detector. Using an output of the light detector, the positioning of the second light guide 66 relative to the first light guide 65 is performed so that an amount of light received by the light detector is maximized. Then, the UV hardening adhesive 70 is hardened by the exposure of ultraviolet rays. A portion of the filter 69 projected from the light guides 65 and 66, if any, is cut out by, for example, grinding or polishing, which would otherwise increase a length of light path from the filter to the light receiver and thereby a light spot received by the light receiver.

Then, the light receiving device 71 is held on the first light guide 65 through the UV hardening adhesive 73 applied therebetween. Light having a wavelength of λ1 is introduced in the first light guide 65, which is reflected at the filtering layer of the filter 69 secured by the opposing ends of the light guides and then transmitted to the light receiver 72. Using an output of the light receiver 72, the position of the light receiving device 71 is adjusted so the light receiver 72 receives the maximum amount of light. Finally, the UV hardening adhesive 73 is hardened by an exposure of ultraviolet rays.

Sixth Embodiment

FIG. 14 shows another optical device according to the sixth embodiment of the present invention. The optical device 10F has a pair of first and second light guides 75 and 76. Preferably, the light guides 75 and 76 are made from optical fiber. End surfaces 77 and 78 of the first and second light guides 75 and 76 are polished to have an angle of 90°-θ. The angled end surface 77 of the first light guide 75 bears a filter 79 for selectively reflecting light having a wavelength of λ1. The filter 79 is formed only by a thin filtering layer deposited by a conventional film formation technique such as vapor deposition. This prevents the deformation of the filtering layer. The angled end surfaces 77 and 78 of the first and second light guides 75 and 76 are connected to each other in an axial fashion by the use of UV hardening adhesive 80 so that they contact closely with each other. A light receiving device 81 having a light receiver 82 is secured on a periphery of the first light guide 75 by the UV hardening adhesive 83 so that light reflected at the filtering layer 77 is received by the light receiver 82.

Figure 15:
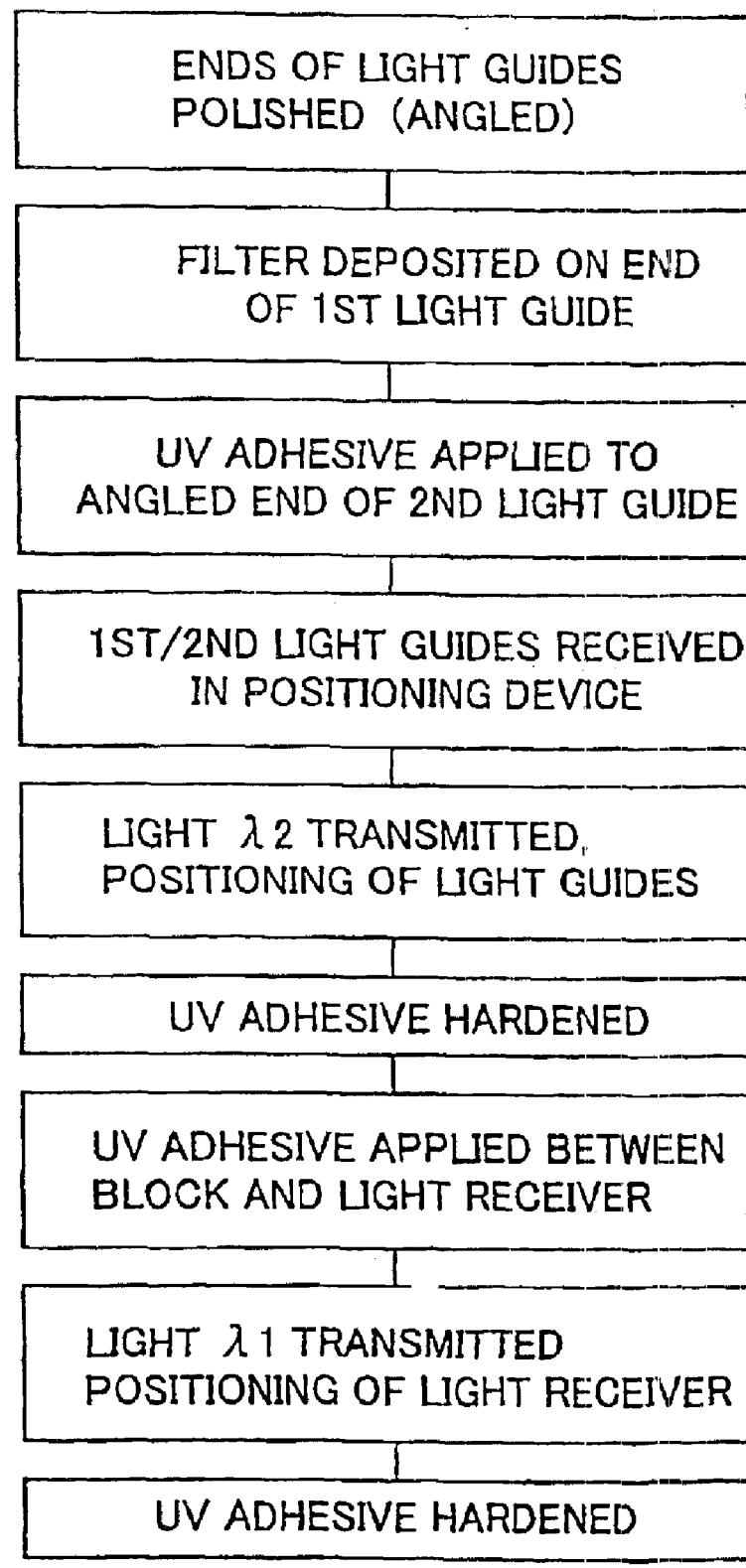
FIG. 15 is a flowchart showing a method for manufacturing the optical device in FIG. 14.

The optical device 10F is manufactured through various processes. For example, as shown in FIG. 15, two light guides 75 and 76 made from optical fiber are prepared. One ends of the light guides 75 and 76 are angled at 90°-θ by a suitable polishing or grinding. Also, the filter 79 is formed on the angled surface 77 of the first light guide 75 by the conventional film formation technique such as vapor deposition.

For connecting the first and second light guides 75 and 76, the UV hardening adhesive 80 is applied to the filter 79 of the first light guide 75. Preferably, the UV hardening adhesive 80 has the same refractive index as the light guides. Then, the first end second light guides 75 and 76 are positioned and aligned in the V-shaped groove of the positioning block shown in FIG. 13A or 13B. In order to avoid a possible deposition of the adhesive to the block, the connecting portion of the light guides 75 and 76 is preferably located in the rectangular-shaped groove. Where there is no possibility of the deposition of the adhesive, another positioning block without such rectangular-shaped groove can be used instead.

Light having a wavelength of λ2 is introduced in the opposite end of the first light guide 75, which is transmitted through the filtering layer 79 into the second light guide 76. The light discharged from the opposite end of the second light guide 76 is detected by a light detector. Using an output of the light detector, the positioning of the second light guide 76 relative to the first light guide 75 is performed so that an amount of light received by the light detector is maximized. Then, the UV hardening adhesive 80 is hardened by the exposure of ultraviolet rays.

With the optical device 10F so constructed, the adhesive having the same refractive index as the light guides is filled entirely at the connection between the first and second light guides, which minimizes the loss of light caused at the boundaries of the light guides. This also eliminates any displacement of light path which would otherwise be caused by the reflection at the boundaries of the members.

Also, the optical device carries no bulky block, which is more economical to that integrally including such positioning block.

Further, the filter is formed only by the thin filtering layer, which further reduces a distance between the opposing surfaces of the first and second light guides. This minimizes a scattering of light and improves a light transmission from the first to second light guides. Also, the filter does not bend or curve by itself, which reflects light in a predetermined direction.

Seventh Embodiment

Figure 16:
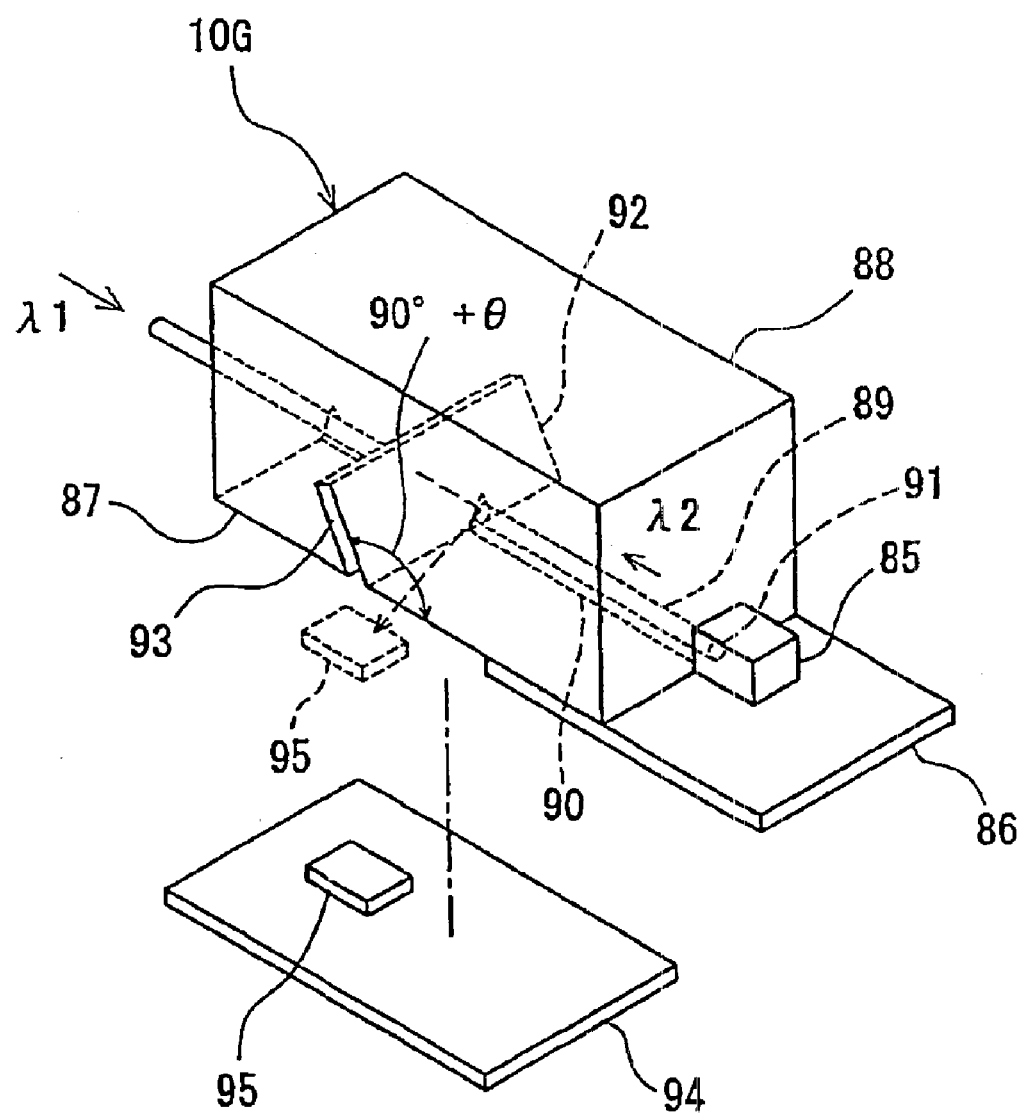
FIG. 16 is an enlarged perspective view of the optical device according to the seventh embodiment of the present invention.

FIG. 16 shows another optical device according to the seventh embodiment of the present invention. The optical device 10G of this embodiment has a light emitter 85 such as laser diode for emitting laser beam including light having a wavelength of $\lambda 2$. The light emitter 85 is mounted on a substrate 86 fixed on the major surface 87 of the block 88. Also, the light emitter 85 is optically connected with the opposite end or inlet end of the first light guide 89 so that light emitted from the light emitter is well introduced in the first light guide 89.

Figure 17:
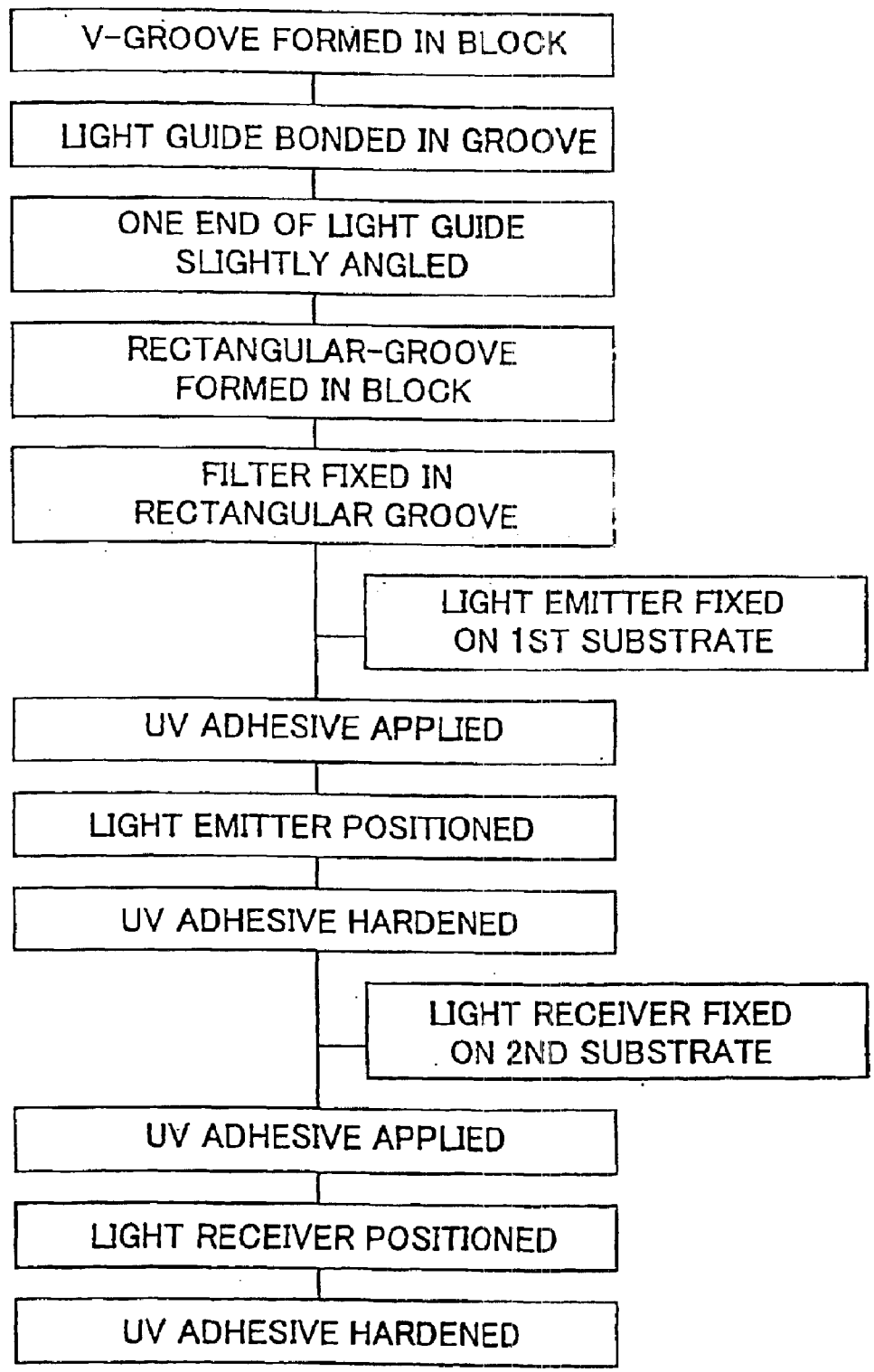
FIG. 17 is a flowchart showing a method for manufacturing the optical device in FIG. 16.
Figure 18:
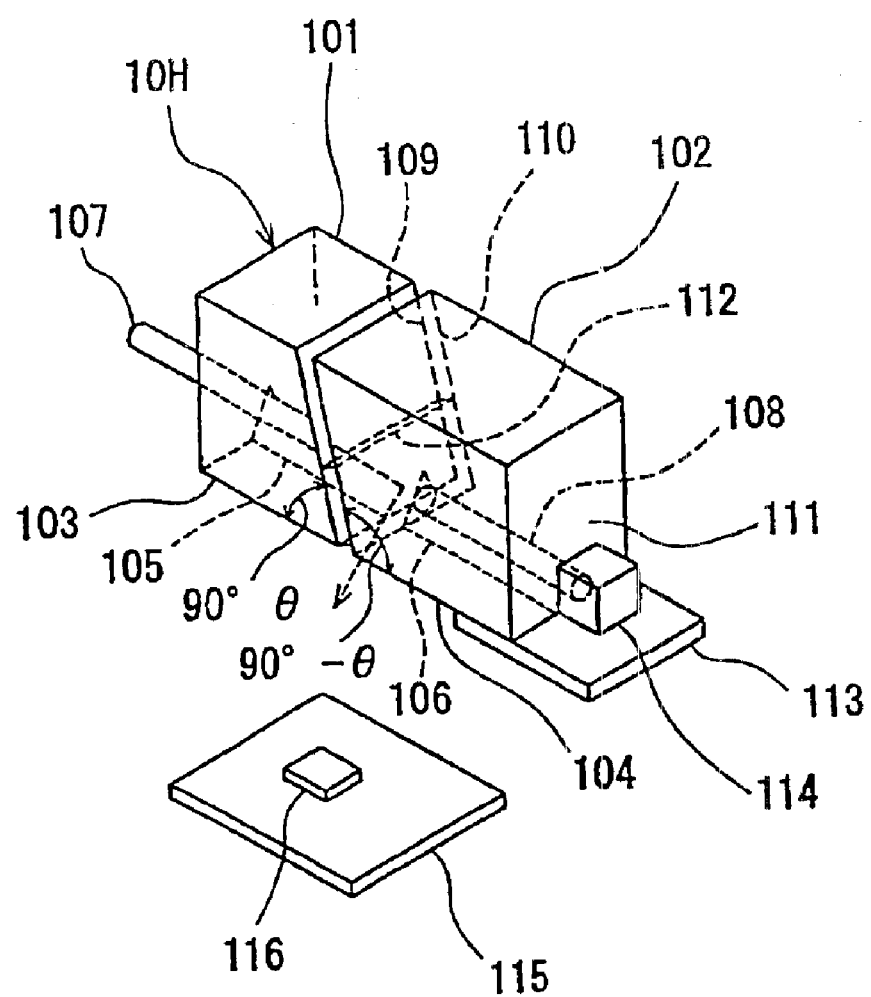
FIG. 18 is an enlarged perspective view of the optical device according to the seventh embodiment of the present invention.

The optical device 10G is manufactured through various processes. For example, as shown in FIGS. 17 and 18, the block 88 is formed with the first positioning portion, e.g., V-shaped groove 90, in which the light guide 89 made from optical fiber is received with its opposite ends projected from the corresponding side surfaces of the block 88 and fixed by the use of suitable bonding material. One end 91 of the light guide 89 is angled by polishing or grinding. Then, the second positioning portion, e.g., rectangular-shaped groove 92 is formed in the major surface 87 of the block 88 so as to orthogonally cross the V-shaped groove 90 and the light guide 89 in a direction perpendicular to the V-shaped groove 90. Preferably, the rectangular-shaped groove 92 is angled at $90°+\theta$ to the major surface portion adjacent to the polished end surface of the light guide 89. The filter 93, which bears the filtering layer capable of reflecting light having a wavelength of $\lambda 1$ on one surface, is positioned and secured using a suitable bonding material in the angled groove 92 between the opposing ends of the light guides so that the filtering layer faces the angled side surfaces of the rectangular-shaped groove 92 and the angled end surface of the light guide 89. This ensures the filter 93 to be held between the light guides without curving or bending, which in turn ensures light from the filter to orient in a predetermined direction.

The light emitter 85 is fixed on the substrate 86 which is then held on the major surface 87 of the block 88 through UV hardening adhesive applied therebetween. Preferably, the adhesive capable of effectively transmitting light having wavelengths of $\lambda 1$ and $\lambda 2$ and having the same refractive index as the light guide 89 is selected. A light detector or power meter is provided on the opposite end of the light guide 89 so that it can detect light discharged through the opposite end of the light guide 89. Then, the light emitter 85 is energized to emit light having a wavelength of $\lambda 2$. The light is detected by the light detector. The position of the light emitter 85 together with the substrate 86 relative to the block 88 is adjusted so that an amount of light detected by the light detector is maximized. After positioning of the light emitter 85, the UV hardening adhesive is hardened by the exposure of ultraviolet rays.

Subsequently, another substrate 94 bearing the light receiver 95 is mounted on the major surface 87 of the block 88 through the UV hardening adhesive applied therebetween. Preferably, the adhesive capable of effectively transmitting light having wavelengths of $\lambda 1$ and $\lambda 2$ and having the same refractive index as the light guide is selected. Then, another light emitter (not shown) is provided at opposite end of the light guide for emitting light having wavelengths of $\lambda 1$ and $\lambda 2$ into the light guide 89. The light travels through the light guide 89 to the filtering layer where a part of light having a wavelength of $\lambda 1$ is reflected and then received by the light receiver 95. Using the output of the light receiver, the position of the second substrate 94 relative to the block 88 is adjusted to maximize an amount of light received by the light receiver. Subsequent to this, the UV hardening adhesive is hardened by the exposure of ultraviolet rays.

In operation, light having the wavelength of $\lambda 1$ introduced from the opposite end of the light guide is reflected by the filter 93 and then detected by the light receiver 95. In this instance, since the light receiver is positioned close to the light guide 89, the light is effectively received by the light receiver 95 and the loss of light between the light guide 89 and the light receiver 95 is minimized.

On the other hand, light emitted from the light emitter 85 having the wavelength of $\lambda 2$ is introduced in the light guide 89, which travels through the filter 93 and then discharged from the opposite end of the light guide 89. In this instance, since the end surface 91 of the light guide 89 adjacent to the light emitter 85 is slightly angled, so that the light hardly reflects at the angled end of the light guide back to the light emitter 85, which would otherwise destabilize an intensity of light emitted from the light emitter.

According to the optical device 10G of this embodiment, the position of the first substrate 86 and the light emitter 85 is determined so that the light detector detects the maximum amount of light from the light emitter. This allows light to be effectively transmitted through the light guide in spite of possible variation of an active layer or a thickness of the semiconductor layer.

Also, the position of the second substrate 94 is determined so that the light receiver 95 receives the maximum amount of light. This allows light having the wavelength of $\lambda 1$ to be transmitted to the light receiver 95 without any negative influence caused by dimensional variation of the grooves and the light guide.

Further, the light guide 89 is positioned close to the light receiver 95, which minimizes an expansion of light beam reflected by the filter 93 to form a small spot on the light receiver 95. This in turn allows to use a high speed light receiver.

Furthermore, although the end surface of the light guide 89 is angled by polishing for preventing the unwanted reflection of light, the reflection can be reduced by coating an anti-reflection layer on the end surface of the light guide.

Eighth Embodiment

FIG. 18 shows another optical device according to the eighth embodiment of the present invention. The optical device 10H of this embodiment has first and second blocks 101 and 102 made of glass, for example. The first and second blocks 101 and 102 have major surfaces 103 and 104 in which first positioning portions, e.g., V-shaped grooves 105 and 106 are formed. The V-shaped grooves 105 and 106 of the first and second blocks 101 and 102 receive light guides, e.g., optical fibers 107 and 108, respectively. The first block 101 has a side surface 109 adjacent to its major surface 103. The side surface 109 together with the corresponding end surface of the first light guide 107 is polished to have an angle of $90°-\theta$ relative to its major surface 103. The second block 102 has also a side surface 110 adjacent to its major surface 104. The side surface 110 together with the corresponding end surface of the second light guide 108 is polished to have an angle of $90°+\theta$ relative to its major surface 104. Preferably, the opposite side surface 111 together with the corresponding opposite end surface of the second light guide 108 is slightly angled.

The first and second blocks 101 and 102 are assembled so that the angled surfaces 109 and 110 face to each other in a parallel fashion and the first and second light guides 107 and 108 oppose in an axial alignment. A filter 112, which selectively reflects light having a wavelength of $\lambda 1$, is securely held between the opposing angled surfaces 109 and 110 of the first and second blocks 101 and 102 by a suitable bonding material. This also prevents the filter from curving or bending, ensuring the reflected light to be oriented in a predetermined direction.

A first substrate 113, bearing a light emitter 114, e.g., laser diode, capable of emitting light having wavelengths of $\lambda 2$, is fixed on the major surface 104 of the second block 102 by the use of UV hardening adhesive so that the light emitter 114 opposes to the slightly angled end surface of the first light guide 108, causing light to be introduced in the second light guide 108. A second substrate 115, bearing a light receiver 116, is fixed on the major surface 103 of the first block 101 by the use of UV hardening adhesive so that the light receiver 116 receives light transmitted through the first light guide 107 and then reflected from the filter 112.

Figure 19:
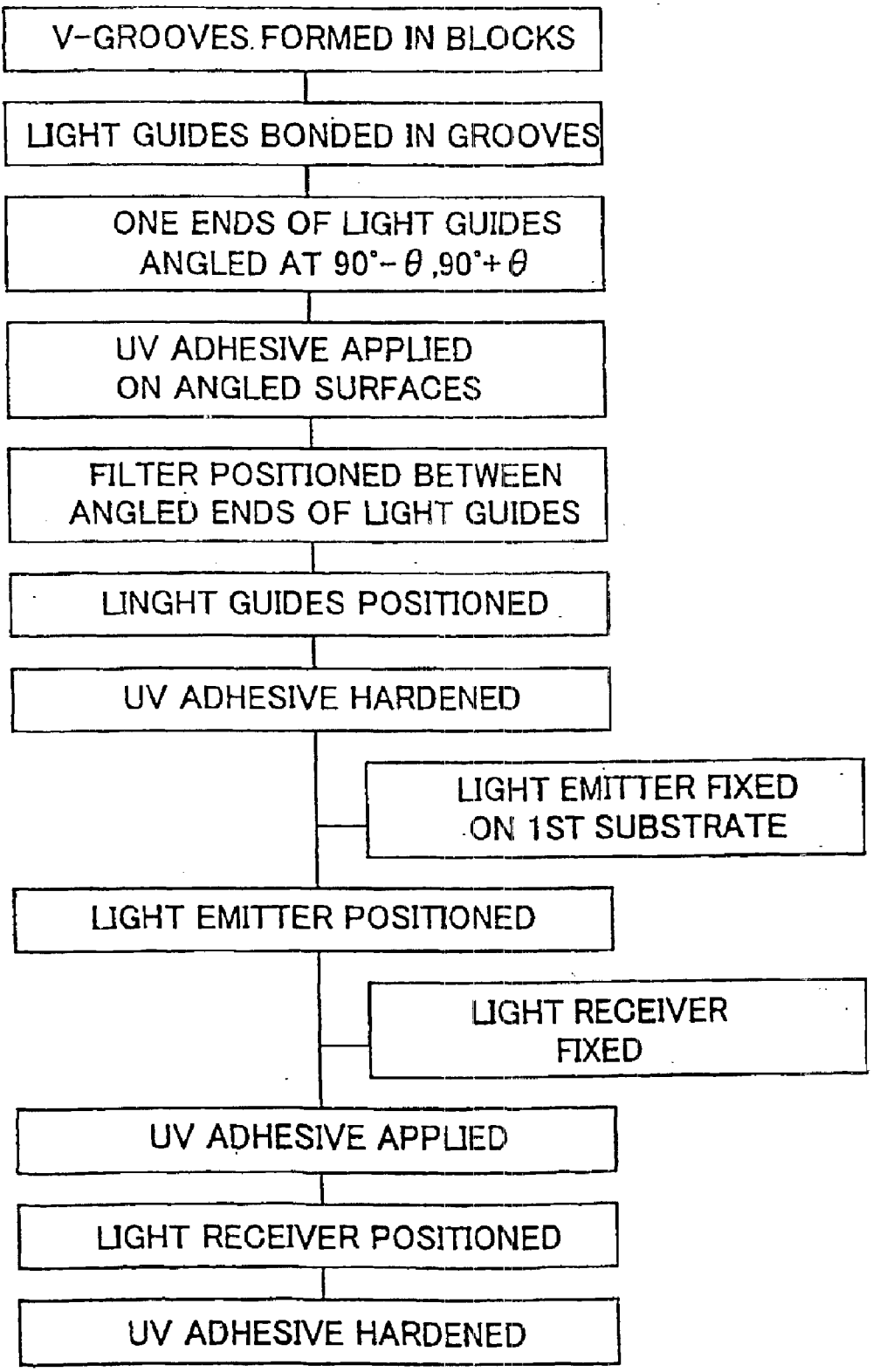
FIG. 19 is a flowchart showing a method for manufacturing the optical device in FIG. 18.

The optical device 10H is manufactured through various processes. For example, as shown in FIG. 19, the first and second blocks 101 and 102 are formed in their major surfaces 103 and 104 with the first and second positioning portion, e.g., first and second V-shaped grooves 105 and 106, in which the first and second light guides 107 and 108 made from optical fiber are received with opposite ends thereof projected from the corresponding side surfaces of the blocks 101 and 102 and fixed by the use of suitable bonding material, respectively. One side surface of the first block 101 together with the corresponding end of the first light guide 107 projected therefrom is polished or ground to have the angle of 90°−θ. Likewise, one side surface of the second block 102 together with the corresponding end of the second light guide 108 projected therefrom is polished or ground to have the angle of 90°+θ. Also, the opposite end of the light guide 108 and, if necessary, the corresponding opposite side surface of the block 102 are polished or ground to have a small angle.

The UV hardening adhesive is applied to either or both of the angled surfaces of the blocks 101 and 102. Preferably, the adhesive has the same refractive index as the light guides 107 and 108 and is capable of efficiently transmitting light with wavelengths of $\lambda 1$ and $\lambda 2$. The filter 112 is placed on the angled surface of the first or second block to which the bonding material has been applied so that it faces to the angled end surface of the corresponding light guide. The first and second blocks 101 and 102 are positioned so that the angled surfaces face to and contact with each other in a parallel fashion.

A light detector or power meter not shown in provided on the slightly angled end surface of the second light guide 108. Then, light having the wavelength of $\lambda 2$ is introduced in the first light guide 107, which travels through the filter 112 and the second light guide 108 into the light detector. Using an output of the light detector, the positions of the fist and second blocks 101 and 102 are adjusted so that the maximum amount of light is detected by the light detector. After adjustment, the UV hardening adhesive is hardened by exposure of ultraviolet rays. Also, the light detector is removed.

The UV hardening adhesive is applied to the major surface of the second block 102 or the corresponding surface of the first substrate 113. Preferably, the adhesive capable of effectively transmitting light $\lambda 1$ and $\lambda 2$ and having the same refractive index as the light guide is used. Then, the first substrate 113 is positioned on the major surface of the second block 102 so that the light emitter 114 faces to the slightly angled end surface of the second light guide 106. In addition, a light detector or power meter is positioned on the opposite end of the first light guide 107. Then, light having the wavelength of $\lambda 2$ is emitted from the light emitter 114, which is transmitted in the second light guide 108 from its slightly angled end surface through the filter 112 into the first light guide 107. Light discharged from the opposite end of the first light guide 107 is detected by the light detector. The position of the first substrate 113 relative to the block 102 is adjusted so that the maximum amount of light is received by the light detector. After adjustment, the UV hardening adhesive is hardened by exposure of ultraviolet rays. Also, the light detector is removed.

Subsequently, the second substrate 102 is mounted on the major surface 103 of the first block 101 through the UV hardening adhesive applied therebetween. Preferably, the adhesive capable of effectively transmitting light $\lambda 1$ and $\lambda 2$ and having the same refractive index as the light guide is used. Then, another light emitter is provided at the opposite end of the second light guide 107 for emitting light having wavelengths of $\lambda 1$ into the first light guide 107. The light travels through the first light guide 107 to the filter 112 where light having the wavelength of $\lambda 1$ is reflected and then received by the light receiver 114. Using the output of the light receiver 114, the position of the second substrate 115 relative to the block 101 is adjusted to maximize an amount of light received by the light receiver. Subsequent to this, the UV hardening adhesive is hardened by the exposure of ultraviolet rays.

In operation, light having the wavelength of $\lambda 1$ introduced from the opposite end of the light guide 107 is reflected by the filter 112 and then detected by the light receiver 116. Since the light receiver 116 is positioned close to the light guide 107, the light is effectively received by the light receiver 116 and the loss of light between the light guide 107 and the light receiver 116 is minimized.

On the other hand, light emitted from the light emitter 114 having the wavelength of $\lambda 2$ is introduced in the light guide 108, which travels through the filter 112 and then discharged from the opposite end of the light guide 107. At this moment, since the end surface of the light guide 108 adjacent to the light emitter 114 is angled, so that the light hardly reflects at the angled end of the light guide 108 back to the light emitter 114, which would otherwise destabilize an intensity of light emitted from the light emitter 114.

Further, since the angled end surfaces 109 and 110 of the first and second light guides 101 and 102 face to each other through only the thin filter 112, which reduces a loss of light to be caused at the connection of the light guides 107 and 108.

Also, the first and second blocks 101 and 102 are connected through the active alignment technique in which they are aligned so that the maximum amount of light is transmitted between the two light guides 107 and 108.

Further, the slightly angled end surface of the light guide 108 prevents a scattering of light, which minimizes a possible cross-talk of light.

Furthermore, although the end surface of the light guide, adjacent to the light emitter 114, is angled by polishing for preventing the unwanted reflection of light, the reflection can be reduced by coating an anti-reflection layer on the end surface of the light guide 108.

Ninth Embodiment

Figure 20:
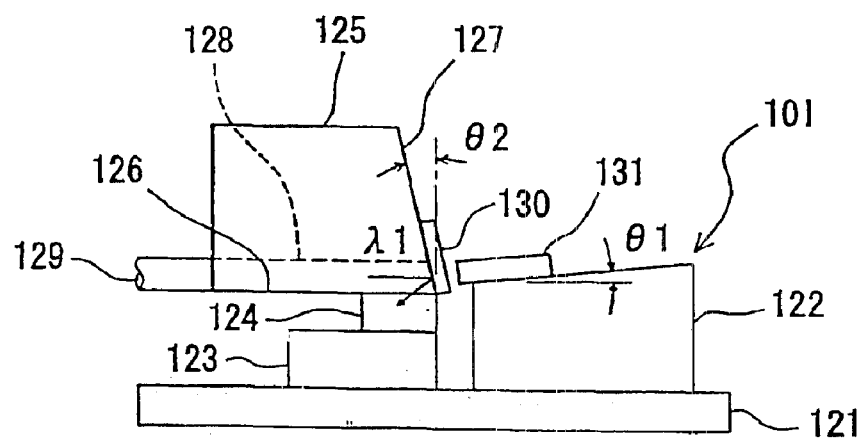
FIG. 20 is an enlarged side elevational view of the optical device according to the ninth embodiment of the present invention.

FIG. 20 shows another optical device according to the ninth embodiment of the present invention. The optical device 10I has a first substrate 121 and a second substrate 122 mounted on the first substrate 121. A top surface of the second substrate 122 is slightly angled at θ1. The first substrate 121 also supports a third substrate 123 for supporting a light receiver 124. Provided on the light receiver 124 is a positioning block 125 made of glass, for example.

Figure 21:
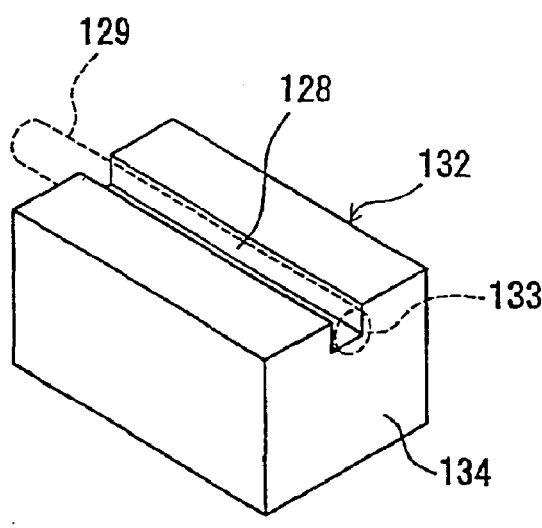
FIG. 21 is an enlarged perspective view of the positioning block in the optical device in FIG. 20.

The block 125 has a bottom surface or major surface 126 and a side surface 127 angled to the major surface 126 at an angle of θ2. The major surface 126 has a positioning portion or V-shaped or rectangular-shaped groove 128 (see FIG. 21) defined therein. The groove 128 receives a light guide 129 made from an optical fiber, for example, so that one end surface of the light guide 129 is flush with the angled side surface 127. Also, the angled side surface 127 of the block 125 supports a filter 130 so that the filter 130 covers the angled end surface of the light guide 129. The filter 130 selectively reflects light having a wavelength of λ1. Opposing to the filter 130, a light emitter or laser diode 131 is mounted on the angled top surface of the second substrate 122 so that light emitted from the light emitter 131 is directed through the filter 130 into the angled end of the light guide 129.

Figure 22:
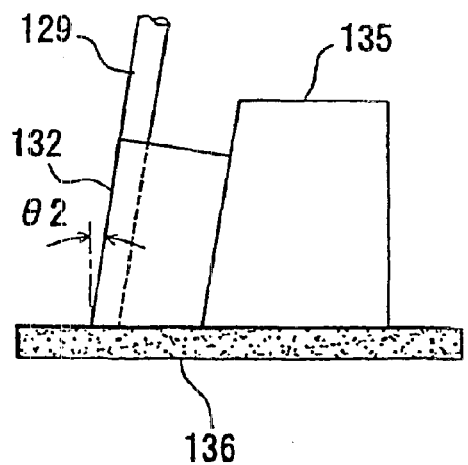
FIG. 22 is a side elevational view showing a method for forming the angled surfaces of the block.
Figure 23:
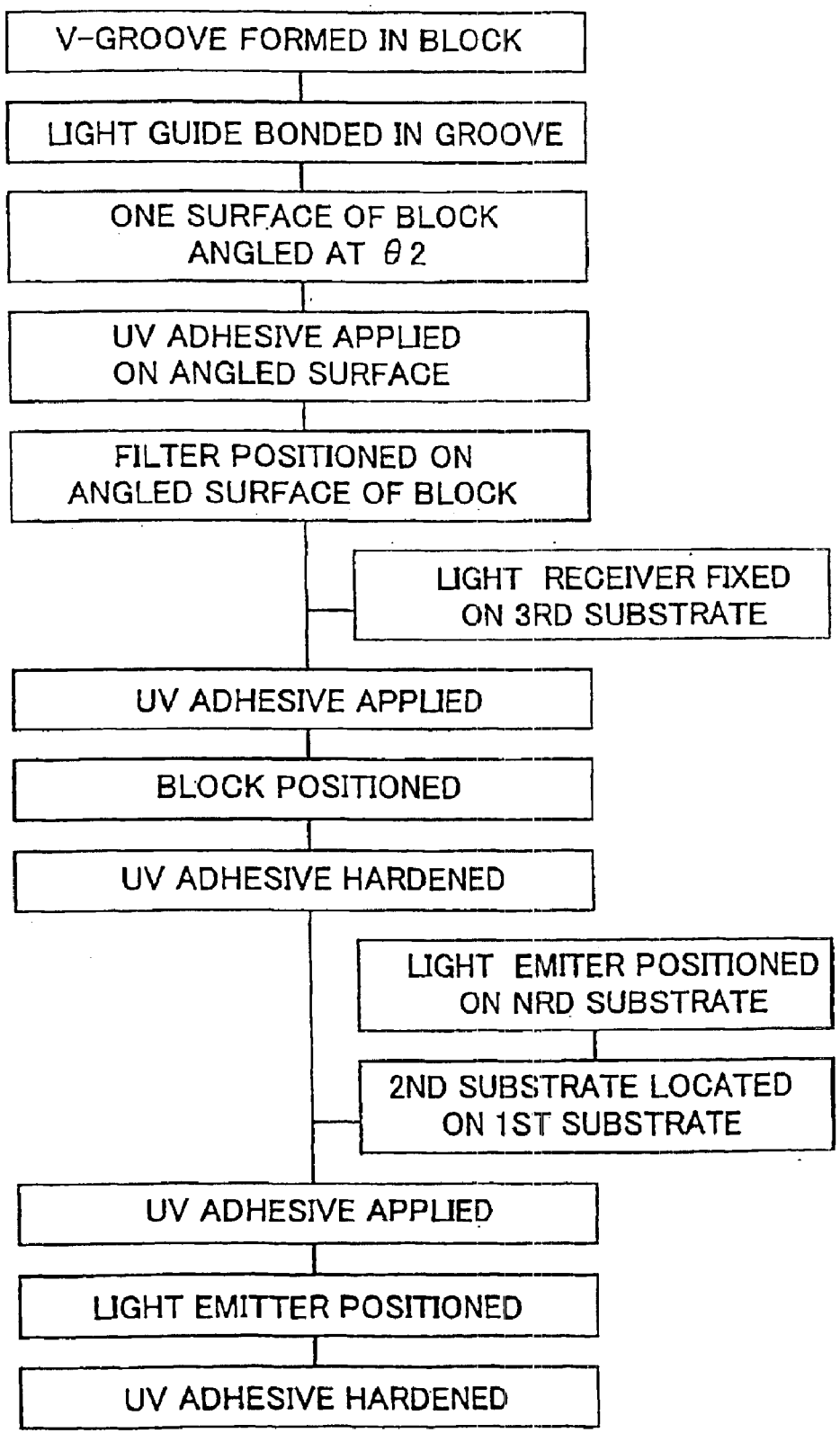
FIG. 23 is a flowchart showing a method for manufacturing the optical device in FIG. 20.
Figure 24:
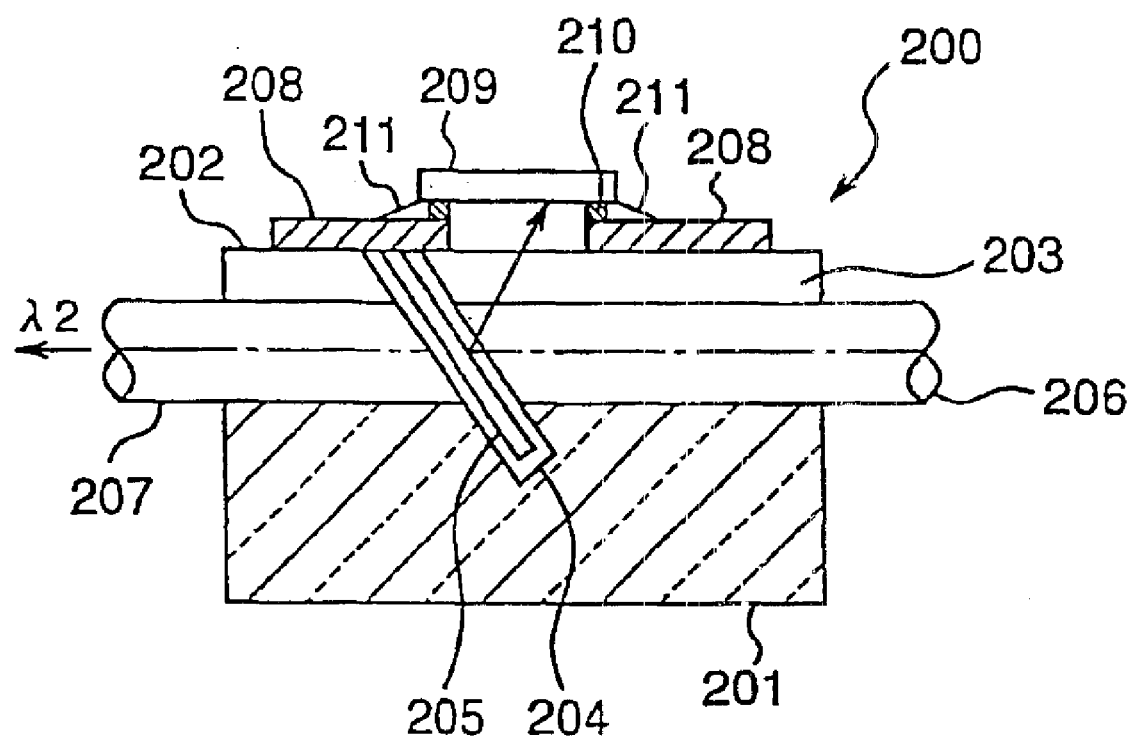
FIG. 24 is a cross sectional view of the conventional optical device.

The optical device 10I is manufactured through various processes shown in FIG. 23. Specifically, a glass body 132 (see FIG. 21) in the form of rectangular prism, for example, is prepared, to which the rectangular-shaped groove 128 is formed by grinding or pressing. The light guide 129 is positioned and fixed in the groove 128 by the use of suitable bonding material so that one end 133 thereof is slightly projected from a neighboring side surface 134 of the body 132. The side surface 134 together with the slightly projected light guide end 133 is polished or ground to form the block 125. In this instance, preferably as shown in FIG. 22, the body 132 is held by a positioning device 135 and angled at the angle of θ2 relative to a grinder 136, which defines the angled surfaces of the block 125 and the light guide 129 so easily.

Next, the UV hardening adhesive is applied to the angled surface 127 of the block 125 or one surface of the filter 130. Then, the filter 130 is forced onto the angled surface 127 of the block 125 so that it faces to the angled end surface of the light guide 129. This prevents the curving or bending of the filter. If necessary, a bending or curving of the filter 130 is eliminated. Also, air between the filter 130 and the block 125, if any, is removed. Then, the UV hardening adhesive is hardened by exposure of ultraviolet rays.

The third substrate 123 to which the light receiver 124 has been fixed is secured on the first substrate 121. The UV hardening adhesive is applied on the light receiver 124 or the major surface 126 of the block 125. Then, the block 125 is positioned on the light receiver 124 through the adhesive. In this situation, light having a wavelength of λ1 is transmitted in the light guide 129 from its one end away from the filter 130, which is reflected by the filter 130 and then received by the light receiver 124. The position of the block 125 relative to the light receiver 124 is adjusted so that the light receiver 124 receives the maximum amount of light. After adjustment, the UV hardening adhesive is hardened by exposure of ultraviolet rays.

The light emitter 131 is fixed on the second substrate 122 which is then positioned on the first substrate 121 through the UV hardening adhesive applied therebetween so that the light emitter 131 faces to the angled end surface of the light guide 129 through the filter 130. A light detector or power meter is provided on the opposite end of the light guide 129 away from the filter 130. Then, the light emitter 131 is energized to emit light, which is transmitted through the filter 130 into the light guide 129. Light discharged from the light guide 129 is detected by the light detector. The output of the light detector is used for the positioning of the second substrate 122. In this positioning, the second substrate 122 is adjusted so that the maximum amount of light is detected by the light detector. Finally, the UV hardening adhesive is hardened by exposure of ultraviolet rays.

According to the optical device 10I, light introduced from one end of the light guide 129, away from the filter 130, is transmitted to the filter 130 where it is reflected into the light receiver 124. In this instance, the light guide 129 is close to the light receiver 124, which ensures the light receiver 124 to receive light so efficiently.

Also, light emitted from the light emitter 131 having the wavelength of λ2 is introduced in the light guide 129, which travels through the filter 130 and then discharged from the opposite end of the light guide 129. At this moment, the angled end surface of the light guide 129 hardly reflects light back into the light emitter 131, which would otherwise destabilize an intensity of light emitted from the light emitter.

Further, according to this embodiment, only one surface of the block 125 is needed to be polished or ground, which reduces a scattering of light. This in turn reduces not only the optical cross-talk at the boundary but also the loss of light.

Furtheremore, according to this embodiment, only one block 129 is needed, which is more economical and allows to ease the grinding and the positioning procedures.

Although the three separate substrates 121–123 are used, they may be integrated into one substrate by the use a three-dimensional wiring.

Although the filter for selectively reflecting light having a specific wavelength is used in the various embodiments, it may be a half-mirror for simply dividing the introduced light into two ways.

Also, although the UV hardening adhesive is used in various embodiments, another bonding material is used instead which is capable of being hardened by the exposure of light or heat.

Further, although in the previous embodiments the block is made of transparent material, it is not restrictive to the present invention. Also, the glass or quartz is preferably used for the block to minimize a difference of heat expansions between the glass block and the glass fiber.

It should be noted that this application is based upon Japanese Patent Application No. 2000-310389, the disclosure of which is hereby incorporated by reference in its entirety.

What is claimed is:

1. An optical device, comprising:
    a block having a first positioning portion and a second positioning portion defined therein;
    first and second light guides positioned in the first positioning portion in an aligned relation to each other, opposing ends of the first and second light guides being angled at a certain angle;
    a filter positioned in the second positioning portion and between the opposing ends of the first and second light guides so that the angled opposing ends substantially contact with opposite surfaces of the filter, respectively, the filter bearing a filtering layer for reflecting light having a first wavelength and transmitting light having a second wavelength;
    a light receiver for receiving the light reflected by the filtering layer; and an adhesive filled between at least one neighboring members selected among the block, the first and second light guides, the filter, and the light receiver, the adhesive having substantially the same refractive index as those of the neighboring members and transmitting the light between the neighboring members.

2. The optical device in accordance with claim 1, wherein the second positioning portion is a V-shaped groove defined in the block.

3. The optical device in accordance with claim 2, further comprising a light emitter optically connected to an open end of any one of the light guides.

4. An optical device, comprising:

first and second light guides;

first and second blocks positioned in a raw for positioning the first to third light guides in an aligned relation to each other, opposing surfaces of the first and second blocks as well as the opposing ends of the first and second light guides being angled at a certain angle;

a filter having a filtering layer on one surface thereof, the filtering layer reflecting light having a first wavelength and transmitting light having second wavelength and positioned between the first and second blocks so that the first filtering layer contacts with the one end of the first light guide;

a light receiver for receiving the light reflected by the filtering layer; and an adhesive filled between at least one neighboring members selected among the first and second light guides, the first and second blocks, the filter, and the light receiver, the adhesive having substantially the same refractive index as these of the neighboring members and transmitting the light between the neighboring members.

5. The optical device in accordance with claim 4, further comprising a light emitter optically connected to an open end of any one of the light guides.

6. An optical device, comprising:

first to third light guides;

first to third blocks positioned in a raw for positioning the first to third light guides in an aligned relation to each other, opposing surfaces of the first and second blocks as veil as the opposing ends of the first and second light guides being angled at a first angle and opposing surfaces of the second and third blocks as well as the opposing ends of the second and third light guides being angled at a second angle;

a first filter having a first filtering layer on one surface thereof, the first filtering layer reflecting light having a first wavelength and transmitting light having second and third wavelengths and positioned between the first and second blocks so that the first filtering layer contacts with the one end of the first light guide;

a second filter having a second filtering layer on one surface thereof, the second filtering layer reflecting light having the second wavelength and transmitting light having the third wavelength and positioned between the second and third blocks so that the second filtering layer contacts with the other end of the second light guide;

a light receiver for receiving the light reflected by the second filtering layer; and an adhesive filled between at least one neighboring members selected among the first to third light guides, the first to third blocks, the first and second filters, and the light receiver, the adhesive having substantially the sane refractive index as those of the neighboring members and transmitting the light between the neighboring members.

7. The optical device in accordance with claim 6, further comprising a light emitter optically connected to an open end of any one of the light guides.

8. An optical device, comprising:

first and second light guides arranged in an aligned relation to each other, opposing ends of the first and second light guides being angled at a certain angle to face each other in a parallel fashion;

a filter held between the opposing angled surfaces of the first and second light guides with its opposite surfaces in contact with the opposing ends of the first and second light guides, respectively, the filter bearing on one surface adjacent to the end surface of the first light guide a filtering layer for reflecting light having a first wavelength and transmitting light having a second wavelength;

a light receiver for receiving the light reflected by the filtering layer; and an adhesive filled between at least one neighboring members selected among the first and second light guides, the filter, and the light receiver, the adhesive having substantially the same refractive index as those of the neighboring member and transmitting the associated light between the neighboring members.

9. The optical device in accordance with claim 8, further comprising a light emitter optically connected to an open end of any one of the light guides.

10. The optical device in accordance of any one of claims 1 to 8, further comprising a light emitter optically connected to an open end of any one of the light guides.

11. An optical device, comprising:

first and second light guides arranged axially in an end to end relationship, opposing ends of the first and second light guides being angled at a certain angle;

a faltering layer deposited on the opposing end of the first light guide for reflecting light having a first wavelength and transmitting light having a second wavelength;

a light receiver for receiving the light reflected by the filtering layers; and an adhesive filled between the opposing ends of the first and second light guides and/or between the light receiver and either of the first and second light guides through which the light reflected by the filter is transmitted toward the light receiver.

12. A optical device, comprising:

a light guide having one end angled at a certain angle;

a filter having a filtering layer for reflecting light having a first wavelength and transmitting light having a second wavelength, the filter being positioned so that the filtering layer contacts with the angled end;

a light receiver for receiving light reflected by the filter;

a light emitter for guiding the light having the second wavelength through the filter into the light guide;

a substrate for positioning the light guide and the light receiver; and an adhesive filled between at least one neighboring members selected among the light guide, the filter, and the light receiver, the adhesive having substantially the same refractive index as those of the neighboring members and transmitting the associated light between the neighboring members.

13. A method for manufacturing an optical device, comprising the steps of:
   positioning a filter in a first positioning portion of a block, the filter having a filtering layer for reflecting light having a first wavelength and transmitting light having a second wavelength;
   positioning first and second light guides in an aligned relation to each other in second positioning portions formed an opposite sides of the filter, respectively, opposing ends of the first and second light guides being angled at a certain angle;
   applying a first adhesive to the opposing angled ends of the first and second light guides, the first adhesive having the same refractive index as those of the light guides;
   holding the filter between the angled ends of the first and second light guides;
   introducing the light having the second wavelength into one of the first and second light guides;
   adjusting the position of the first light guide relative to the second light guide so that a predetermined amount of light is discharged from the other of the first and second light guides and then fixing he first and second light guides;
   positioning a light receiver on the block through a second adhesive applied therebetween, the second adhesive having the same refractive index as those of the light guides;
   introducing the light having the first wavelength into one of the first and second light guides; and
   adjusting the position of the light receiver relative to the light guide so that a predetermined amount of light is received by the light receiver and then fixing the light receiver.

14. A method for manufacturing an optical device, comprising the steps of:
   preparing first and second blocks; each block being prepared by
   placing a light guide in a positioning portion of a substrate;
   applying an adhesive between the light guide and the substrate, the adhesive having the same refractive index as the light guide; and
   hardening the adhesive for fixing the light guide to the substrate, thereby forming a block;
   polishing one end of the first block and a corresponding one end of the first light guide fixed thereon to have an angle of 90°−θ;
   polishing one end of the second block and a corresponding one end of the second light guide fixed thereon to have an angle of 90°+θ;
   applying an adhesive to the one angled ends of the first and second light guides, the adhesive having the same refractive index as the light guides;
   placing a filter on the angled end of the first or second light guides, the filter having a filtering layer reflecting light having a first wavelength and transmitting light having a second wavelength;
   introducing the light hating the second wavelength into one of the first and second light guides and adjusting a relative position of the first and second blocks so that a predetermined amount of light is discharged from the other of the first and second light guides;
   placing a light receiver on one of the first and second light guides;
   applying an adhesive to the first or second light guides, the adhesive having the same refractive index as the light guides; and
   introducing the light having the first wavelength into one of first and second light guides and adjusting a position of the light receiver so that a predetermined amount of light is received by the light receiver.

15. The method in accordance with claim 14, wherein the light guide into which the light having the second wavelength is introduced is connected with a light emitter that emits the light having the second wavelength.

16. A method of manufacturing an optical device, comprising the steps of:
   preparing first and second light guides each having one end angled at a certain angle;
   aligning the first and second light guides so that the angled ends thereof oppose to each other in a parallel fashion;
   applying an adhesive on the opposing angled ends of the first and second light guides, the adhesive having the same refractive index as the light guides;
   holding a filter between the opposing angled ends of the first and second light guides, the filter having a filtering layer that reflects light having a first wavelength and transmits light having a second wavelength;
   introducing the light having the second wavelength into one of the first and second light guides and adjusting a relative position of the first and second light guides so that a predetermined amount of light is discharged from the other of the first and second light guides;
   placing a light receiver on one of the first and second light guides;
   applying an adhesive to the first or second light guides, the adhesive having the same refractive index as the light guides; and
   introducing the light having the first wavelength into one of first and second light guides and adjusting a position of the light receiver so that a predetermined amount of light is received by the light receiver.

17. The method in accordance with claim 16, wherein the light guide into which the light having the second wavelength is introduced is connected with a light emitter that emits the light having the second wavelength.

18. A method of manufacturing an optical device, comprising the stops of:
   preparing first and second light guides each having one end angled at a certain angle, the angled end of the first light guide bearing a filtering layer that reflects light having a first wavelength and transmits light having a second wavelengths;
   applying an adhesive on the opposing angled ends of the first and second light guides the adhesive having the same refractive index as the light guides;
   aligning the first and second light guides so that the angled ends thereof contact to each other through the adhesive;
   introducing the light having the second wavelength into one of the first and second light guides and adjusting a relative position of the first and second light guides so that a predetermined amount of light is discharged from the other of the first and second light guides;
   placing a light receiver on one of the first and second light guides;
   applying an adhesive to the first or second light guides, the adhesive having the same refractive index as the light guides; and introducing the light having the first wavelength into one of first and second light guides and adjusting a position at the light receiver so that a predetermined amount of light is received by the light receiver.

19. The method in accordance with claim 18, wherein the light guide into which the light having the second wavelength is introduced is connected with a light emitter that emits the light having the second wavelength.

20. The method in accordance with any one of claims 13–18, wherein the light guide into which the light having the second wavelength is introduced is connected with a light emitter that emits the light having the second wavelength.

21. A method for manufacturing an optical device, comprising the steps of:

preparing a blocks; the block being prepared by placing a light guide in a positioning portion of a substrate; and applying an adhesive between the light guide and the substrate, the adhesive having the same refractive index as the light guide, thereby forming a block;

polishing one end of the block and a corresponding one end of the light guide fixed thereon to have a certain angle;

applying an adhesive to the one angled ends of the light guide, the adhesive having the same refractive index as the light guides;

placing a filter on the angled end of the light guide, the filter having a filtering layer reflecting light having a first wavelength and transmitting light having a second wavelength;

placing a light receiver on the light guide through an adhesive having the same refractive index as the light guides; and introducing the light having the first wavelength into the light guide and adjusting a position of the light receiver so that a predetermined amount of light is received by the light receiver;

placing a light emitter emitting the light having the second wavelength against the filter; and emitting the light having the second wavelength from light emitter so that a predetermined amount of light is introduced into the light guide.

* * * * *

UNITED STATES PATENT AND TRADEMARK OFFICE
CERTIFICATE OF CORRECTION

PATENT NO. : 6,892,009 B2
DATED : May 10, 2005
INVENTOR(S) : Masami Ito et al.

It is certified that error appears in the above-identified patent and that said Letters Patent is hereby corrected as shown below:

Title page,
Item [56], References Cited, OTHER PUBLICATIONS, "Uno T. et al." reference, please amend as follows:
-- *Module for Access Networks"*, Electronic Components & --.

Column 17,
Line 43, please amend as follows:
-- as well as the opposing ends of the first and second light --.

Column 18,
Lines 32-33, please amend as follows:
-- The optical device in accordance with claim 1, further comprising a light emitter connected --.
Line 40, please amend as follows:
-- a filtering layer deposited on the opposing end of the first --.

Column 19,
Line 59, please amend as follows:
-- introducing the light having the second wavelength into --.

Column 21,
Lines 9-10, please amend as follows:
-- The method in accordance with claim 13, wherein the light guide into which the light having --.

Signed and Sealed this

Fourth Day of October, 2005

JON W. DUDAS
*Director of the United States Patent and Trademark Office*